(12) United States Patent
Price et al.

(10) Patent No.: US 10,449,589 B2
(45) Date of Patent: *Oct. 22, 2019

(54) METHOD AND DEVICE FOR FORMING GROOVES IN PIPE ELEMENTS

(71) Applicant: Victaulic Company, Easton, PA (US)

(72) Inventors: Anthony Price, Nazareth, PA (US); Daniel B. Vicario, II, Spring City, PA (US); Matthew J. Puzio, Easton, PA (US); Douglas R. Dole, Whitehouse Station, NJ (US)

(73) Assignee: Victaulic Company, Easton, PA (US)

( * ) Notice: Subject to any disclaimer, the term of this patent is extended or adjusted under 35 U.S.C. 154(b) by 321 days.

This patent is subject to a terminal disclaimer.

(21) Appl. No.: 15/136,185

(22) Filed: Apr. 22, 2016

(65) Prior Publication Data

US 2016/0236256 A1   Aug. 18, 2016

Related U.S. Application Data

(62) Division of application No. 13/964,671, filed on Aug. 12, 2013, now Pat. No. 9,333,548.

(51) Int. Cl.
*B21D 17/04* (2006.01)
*B23Q 17/24* (2006.01)

(52) U.S. Cl.
CPC .............. *B21D 17/04* (2013.01); *B23Q 17/24* (2013.01)

(58) Field of Classification Search
CPC ........ B21D 17/04; B23Q 15/00; B23Q 15/02; B23Q 15/06; B23Q 15/14; B23Q 17/20; B23Q 17/24; B23Q 17/2452; B23Q 17/2471; B23Q 17/248; B23Q 17/10; B23Q 17/2466

See application file for complete search history.

(56) References Cited

U.S. PATENT DOCUMENTS

| 3,172,208 A | 3/1965 | Lowy |
| 3,561,121 A | 2/1971 | Culver |
| 3,995,466 A | 12/1976 | Kunsman |
| 4,041,747 A | 8/1977 | Elkin |
| 4,110,910 A | 9/1978 | Dombrowski |
| 4,454,739 A | 6/1984 | Ciccorelli |
| 4,557,126 A | 12/1985 | Niino et al. |

(Continued)

FOREIGN PATENT DOCUMENTS

| CH | 688728 | 1/1998 |
| CN | 101284360 A | 10/2008 |

(Continued)

OTHER PUBLICATIONS

Translation, JP 63-132739A, Jun. 1988.*

(Continued)

*Primary Examiner* — Edward T Tolan
(74) *Attorney, Agent, or Firm* — Ballard Spahr LLP

(57) ABSTRACT

A method of forming circumferential grooves in pipe elements using opposed rollers to cold work the pipe elements determines the diameter of the groove while the pipe element is rotated between the rollers. A device for executing the method uses the instantaneous determinations of the groove depth in a feed-back loop to control the operation of the device and halt groove formation when the groove depth is within a specified tolerance.

15 Claims, 21 Drawing Sheets

(56) References Cited

U.S. PATENT DOCUMENTS

| | | | |
|---|---|---|---|
| 4,700,484 A | 10/1987 | Frank | |
| 5,197,200 A | 3/1993 | Bahr | |
| 5,564,253 A | 10/1996 | Nakaya | |
| 5,767,963 A * | 6/1998 | Berger | B65H 63/003 226/10 |
| 5,815,400 A | 9/1998 | Hirai | |
| 5,823,460 A | 10/1998 | Hermanns | |
| 5,857,369 A | 1/1999 | Fang | |
| 5,927,360 A | 7/1999 | Nakamura et al. | |
| 6,196,039 B1 | 3/2001 | Williams et al. | |
| 6,240,761 B1 | 6/2001 | Suzuki et al. | |
| 6,272,895 B1 | 8/2001 | Hamm | |
| 6,431,609 B1 | 8/2002 | Andersson | |
| 6,473,981 B2 | 11/2002 | Dole | |
| 7,174,761 B2 | 2/2007 | Iwamoto et al. | |
| 8,215,211 B2 | 7/2012 | Akiyama et al. | |
| 2002/0112359 A1 | 8/2002 | Dole | |
| 2002/0129635 A1 | 9/2002 | Dole | |
| 2004/0016139 A1 | 1/2004 | Lam et al. | |
| 2005/0212296 A1 | 9/2005 | Dole | |
| 2006/0022436 A1 * | 2/2006 | Morita | B26D 3/085 280/728.2 |
| 2007/0225939 A1 | 9/2007 | Glascock | |
| 2009/0041553 A1 * | 2/2009 | Burke | B23C 3/30 408/1 R |
| 2009/0059206 A1 | 3/2009 | Churchhill et al. | |
| 2011/0056344 A1 | 3/2011 | Dick et al. | |
| 2012/0039679 A1 | 2/2012 | Kundracik et al. | |
| 2013/0160309 A1 | 6/2013 | Logan et al. | |

FOREIGN PATENT DOCUMENTS

| | | | |
|---|---|---|---|
| CN | 201848467 | | 6/2011 |
| CN | 202056396 U | | 11/2011 |
| CN | 292141444 U | | 2/2012 |
| CN | 202255215 U | | 5/2012 |
| CN | 102615158 | | 8/2012 |
| DE | 3824856 A1 | | 1/1990 |
| EP | 1038603 A2 | | 9/2000 |
| EP | 2759354 A1 | | 7/2014 |
| IN | 20050037212 | | 10/2009 |
| JP | 58110106 A | | 6/1983 |
| JP | 58196110 A | | 11/1983 |
| JP | 58196111 A | | 11/1983 |
| JP | S58-212817 A | | 12/1983 |
| JP | 59104208 A | | 6/1984 |
| JP | 59163034 A | | 9/1984 |
| JP | 63-132739 A * | 6/1988 | B21H 8/00 |
| JP | H03-004315 U | | 1/1991 |
| JP | H07-100545 A | | 4/1995 |
| JP | 2001353532 | | 12/2001 |
| JP | 2013103237 | | 5/2013 |
| TW | 318163 | | 10/1997 |
| TW | 359735 B | | 6/1999 |
| TW | 470675 | | 1/2002 |
| WO | 03040646 A2 | | 5/2003 |
| WO | 2010037904 | | 4/2010 |

OTHER PUBLICATIONS

Pieracci, Andrea; Supplementary Partial European Search Report from counterpart European patent application No. 14836189, dated Jun. 15, 2016, pp. 1-6, European Patent Office, Munich, Germany.
Pieracci, Andrea; Eruopean Search Report and Search Opinion from counterpart European patent application No. 16155634, dated Jun. 15, 2016, pp. 1-7, European patent Office, Munich, Germany.
Author Unknown; English Translation of and Office Action from counterpart Chinese patent application No. 201480045313.7; dated Oct. 13, 2017; English Translation pp. 11-20; Translated by China Patent Agent (H.K.) Ltd; Hong Kong.

* cited by examiner

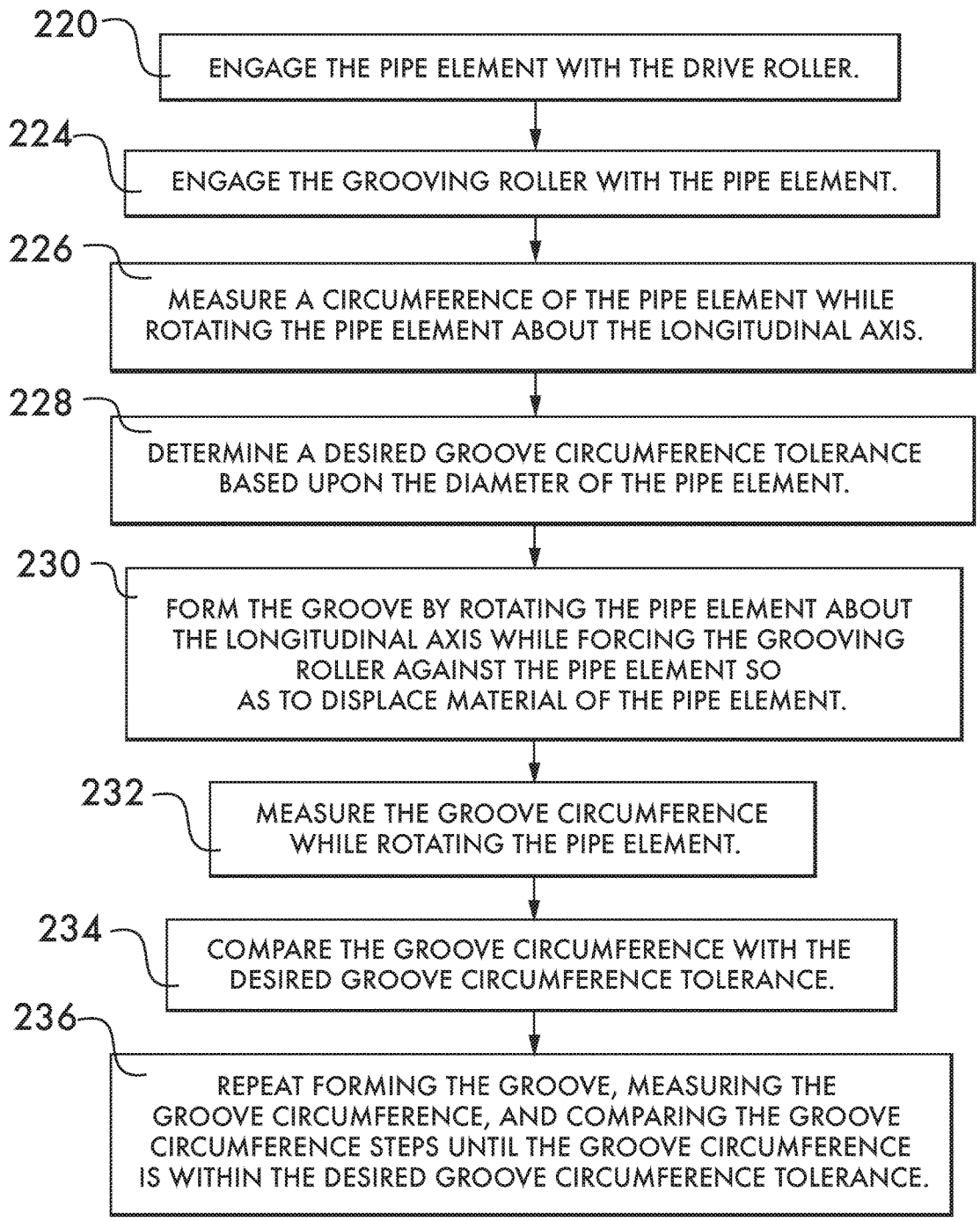

METHOD AND DEVICE FOR FORMING GROOVES IN PIPE ELEMENTS

CROSS REFERENCE TO RELATED APPLICATION

This application is a divisional of and claims priority to U.S. patent application Ser. No. 13/964,671, filed Aug. 12, 2013 and hereby incorporated by reference.

FIELD OF THE INVENTION

This invention concerns methods and devices for forming a circumferential groove in a pipe element.

BACKGROUND

Pipe elements, which include any pipe-like item such as pipe stock, as well as fittings, including, for example elbows, tees and straights and components such as valves, strainers, end caps and pump intakes and outlets, may be sealingly joined in end to end relation using mechanical pipe couplings, an example of which is disclosed in U.S. Pat. No. 7,086,131. The couplings are formed of two or more segments joined end to end by threaded fasteners. In use, the coupling segments are positioned surrounding the pipe elements and are drawn toward one another and into engagement with the pipe elements by tightening the threaded fasteners. The pipe elements may have circumferential grooves which are engaged by radially projecting keys on the pipe couplings to provide positive restraint to thrust loads experienced by the pipe elements when under internal pressure from the fluid within. An elastomeric gasket, often in the form of a ring, is positioned between the coupling segments and the pipe elements to ensure fluid tightness of the joint. The gasket may have glands which use the internal fluid pressure within the pipe elements to increase the maximum pressure at which it remains effective to prevent leaks. The gasket is compressed radially between the coupling segments and the pipe elements to effect the fluid tight seal desired.

To form a fluid tight joint using a mechanical coupling with grooved pipe elements it is necessary to control the dimensions of the circumferential grooves of the pipe elements so that the grooves properly engage the keys of the coupling elements and also allow the segments to move toward one another and compress the gasket sufficiently to effect the fluid tight seal. Grooves may be formed by cold working the side wall of the pipe element between opposed rollers which are forced toward one another to displace material of the pipe element, typically by hydraulic means, while they are turning about substantially parallel axes of rotation. The pipe element rotates in response (or the rollers orbit around the pipe circumference) and the groove is formed about the pipe element circumference. Dimensional control of the grooves is made difficult by the allowable tolerances of the pipe dimensions. For example, for steel pipe, the tolerances on the diameter may be as great as +/−1%, the wall thickness tolerance is −12.5% with no fixed upper limit, and the out of roundness tolerance is +/−1%. These relatively large dimensional tolerances present challenges when forming the circumferential grooves by cold working. It would be advantageous to develop a method and an apparatus which actively measures a parameter, such as the groove diameter, and uses such measurements, as the groove is being formed, to control the motion of groove forming rollers as they form the groove. This will avoid the trial groove and measure/adjust procedure of the prior art.

SUMMARY

The invention concerns a method of forming a circumferential groove in a pipe element having a longitudinal axis. The method is effected using a drive roller and a grooving roller.

One example method of forming a circumferential groove in a pipe element having a longitudinal axis comprises:
  engaging the pipe element with the drive roller;
  engaging the grooving roller with the pipe element;
  measuring a diameter of the pipe element while rotating the pipe element about the longitudinal axis;
  calculating a desired groove depth tolerance corresponding to a desired groove diameter tolerance;
  forming the groove by rotating the pipe element about the longitudinal axis while forcing the grooving roller against the pipe element so as to displace material of the pipe element;
  while rotating the pipe element, measuring the groove depth;
  comparing the groove depth with the desired groove depth tolerance; and
  repeating forming the groove, measuring the groove depth, and comparing the groove depth with the desired groove depth tolerance until the groove depth is within the desired groove depth tolerance.

By way of further example, the step of measuring the diameter of the pipe element comprises:
  rotating the pipe element while the pipe element is engaged with the grooving roller, the grooving roller having a known diameter and rotating in response to the pipe element;
  determining a number of revolutions of the grooving roller, including fractions thereof, for each revolution of the pipe element; and
  calculating the diameter of the pipe element, wherein the number of revolutions of the grooving roller, including the fractions thereof, per revolution of the pipe element being proportional to the diameter of the pipe element.

An example step of determining the number of revolutions of the grooving roller, including the fractions thereof, comprises counting the number of revolutions of the grooving roller, including the fractions thereof, for at least one the revolution of the pipe element.

A specific example method of determining the at least one revolution of the pipe element comprises sensing a feature on the pipe element a first and a second time while rotating the pipe element.

In a particular example the at least one revolution of the pipe element is determined by:
  marking an outer surface of the pipe element with a light reflecting surface that contrasts with the outer surface of the pipe element;
  shining a light onto the outer surface of the pipe element;
  sensing a first and a second reflection of the light from the light reflecting surface while rotating the pipe element.

In another example, the at least one revolution of the pipe element is determined by:
  positioning a magnet on a surface of the pipe element;
  sensing a first and a second magnetic field while rotating the pipe element.

Further by way of example, the step of engaging the grooving roller with the pipe element comprises pinching the pipe element between the grooving roller and the drive roller with sufficient force to hold the pipe element therebetween. Specifically by way of example, the step further comprises engaging an inner surface of the pipe element with the drive roller and engaging an outer surface of the pipe element with the grooving roller.

Another example embodiment of the method comprises selecting a rotational speed for rotating the pipe element based upon at least one characteristic of the pipe element. By way of example the at least one characteristic of the pipe element is selected from the group consisting of a diameter, a wall thickness, a material of the pipe element and combinations thereof.

A further example of the method comprises selecting a force for forcing the grooving roller against the pipe element based upon at least one characteristic of the pipe element. In this example the at least one characteristic of the pipe element is selected from the group consisting of a diameter, a wall thickness, a material of the pipe element and combinations thereof.

Again by way of example, the method further comprises selecting a feed rate of the grooving roller for forming the groove in the pipe element based upon at least one characteristic of the pipe element. Specifically by way of example, the at least one characteristic of the pipe element is selected from the group consisting of a diameter, a wall thickness, a material of the pipe element and combinations thereof.

In an example embodiment of the method, the step of measuring the groove depth while rotating the pipe element comprises:
 projecting a fan-shaped beam of light onto the pipe element;
 sensing a reflection of the fan-shaped beam of light;
 using triangulation methods to calculate the groove depth.

The invention further encompasses a device for forming a circumferential groove in a pipe element having a longitudinal axis. In one example embodiment, the device comprises a drive roller rotatable about a drive roller axis. The drive roller is engageable with an inner surface of the pipe element when the drive roller axis is oriented substantially parallel to the longitudinal axis of the pipe element. A grooving roller is rotatable about a grooving roller axis oriented substantially parallel to the drive roller axis. The grooving roller has a known diameter. The grooving roller is movable toward and away from the drive roller so as to forcibly engage the outer surface of the pipe element and form the groove therein upon rotation of the pipe element. A first sensor is used to determine a degree of rotation of the grooving roller and generate a first signal indicative thereof. A second sensor is used to determine a degree of rotation of the pipe element and generate a second signal indicative thereof. A control system is adapted to receive the first and second signals, use the first and second signals to determine a diameter of the groove, and control motion of the grooving roller toward and away from the drive roller in response to the diameter of the groove.

By way of example, the first sensor may comprise a rotational encoder operatively associated with the grooving roller. Also by way of example, the second sensor may comprise a light reflecting surface affixed to an outer surface of the pipe element. The light reflecting surface contrasts with the outer surface of the pipe element. A light projector is positioned to project light onto the outer surface of the pipe element and the light reflecting surface affixed thereto. A detector, adapted to detect light projected by the light projector upon reflection from the light reflecting surface, generates the signal indicative thereof. By way of example, the light projector may comprise a laser. Further in example, the light reflecting surface may be selected from the group consisting of a specular reflecting surface, a diffuse reflecting surface, a contrasting color reflecting surface and combinations thereof. In another example embodiment, the second sensor comprises a magnet affixed to a surface of the pipe element. A detector is adapted to detect a magnetic field. The detector generates a signal indicative thereof. In another example embodiment, the device may further comprise a third sensor for measuring a surface profile of at least a portion of the pipe element and generating a signal indicative thereof. The third sensor may, for example, comprise a laser adapted to project a fan-shaped beam along a at least the portion of the pipe element. A detector receives a reflection of the fan-shaped beam from the portion of the pipe element. A calculator unit converts the reflection into measurements representing the surface profile using triangulation. The calculator unit then generates the signal indicative of the measurements and transmits the signal to the control system.

By way of example, the grooving roller may be mounted on an actuator controlled by the control system, the actuator comprising a hydraulic ram for example.

The invention further encompasses a device for forming a circumferential groove in a pipe element having a longitudinal axis. In an example embodiment, the device comprises a drive roller rotatable about a drive roller axis. The drive roller is engageable with an inner surface of the pipe element when the drive roller axis is oriented substantially parallel to the longitudinal axis of the pipe element. A grooving roller is rotatable about a grooving roller axis oriented substantially parallel to the drive roller axis. The grooving roller is movable toward and away from the drive roller so as to forcibly engage an outer surface of the pipe element so as to displace material of the pipe element and form the groove therein upon rotation of the pipe element. An idler roller is rotatable about an idler roller axis oriented substantially parallel to the drive roller axis. The idler roller has a known diameter. The idler roller is movable toward and away from the drive roller so as to engage an outer surface of the pipe element so as to rotate upon rotation of the pipe element. A first sensor determines a degree of rotation of the idler roller and generates a first signal indicative thereof. A second sensor determines a degree of rotation of the pipe element and generates a second signal indicative thereof. A control system is adapted to receive the first and second signals and use the first and second signals to determine a diameter of the groove, and control motion of the grooving roller toward and away from the drive roller in response to the diameter of the groove.

In a particular example embodiment, the first sensor comprises a rotational encoder operatively associated with the idler roller. By way of further example, the second sensor may comprise a light reflecting surface affixed to an outer surface of the pipe element. The light reflecting surface contrasts with the outer surface of the pipe element. A light projector is positioned to project light onto the outer surface of the pipe element and the light reflecting surface affixed thereto. A detector is adapted to detect light projected by the light projector upon reflection from the light reflecting surface, the detector generating a signal indicative thereof. The light projector may, for example, comprise a laser.

In another example embodiment, the second sensor may comprise a magnet affixed to a surface of the pipe element. A detector is adapted to detect a magnetic field. The detector generates a signal indicative thereof. The example device may further comprise a third sensor for measuring a surface profile of at least a portion of the pipe element and generating a signal indicative thereof. In a particular example embodiment, the third sensor comprises a laser adapted to project a fan-shaped beam along at least the portion of the pipe element. A detector is adapted to receive a reflection of the fan-shaped beam from the portion of the pipe element. A calculator unit converts the reflection into measurements representing the surface profile using triangulation. The sensor generates the signal indicative of the measurements and transmits the signal to the control system.

In a particular example embodiment, the grooving roller is mounted on an actuator that is controlled by the control system. Similarly by way of example, the idler roller may be mounted on an actuator that is controlled by the control system.

In another example embodiment of a device for forming a circumferential groove in a pipe element having a longitudinal axis, the device comprises a drive roller rotatable about a drive roller axis. The drive roller is engageable with an inner surface of the pipe element when the drive roller axis is oriented substantially parallel to the longitudinal axis of the pipe element. A grooving roller, rotatable about a grooving roller axis oriented substantially parallel to the drive roller axis, has a known diameter. The grooving roller is movable toward and away from the drive roller so as to forcibly engage an outer surface of the pipe element and form the groove therein upon rotation of the pipe element. A sensor is used to measure a surface profile of at least a portion of the pipe element and generate a signal indicative thereof. A control system, adapted to receive the signal, uses the signal to determine a diameter of the groove and control motion of the grooving roller toward and away from the drive roller in response to the diameter of the groove.

In a particular example embodiment, the sensor comprises a laser adapted to project a fan-shaped beam along at least the portion of the pipe element. A detector receives a reflection of the fan-shaped beam from the portion of the pipe element. A calculator unit converts the reflection into measurements representing the surface profile using triangulation, generates the signal indicative of the measurements and transmits the signal to the control system.

BRIEF DESCRIPTION OF THE DRAWINGS

FIGS. 9-17 are flow charts illustrating example methods of forming grooves in the pipe element shown in FIG. 8.

DETAILED DESCRIPTION

Figure 1:
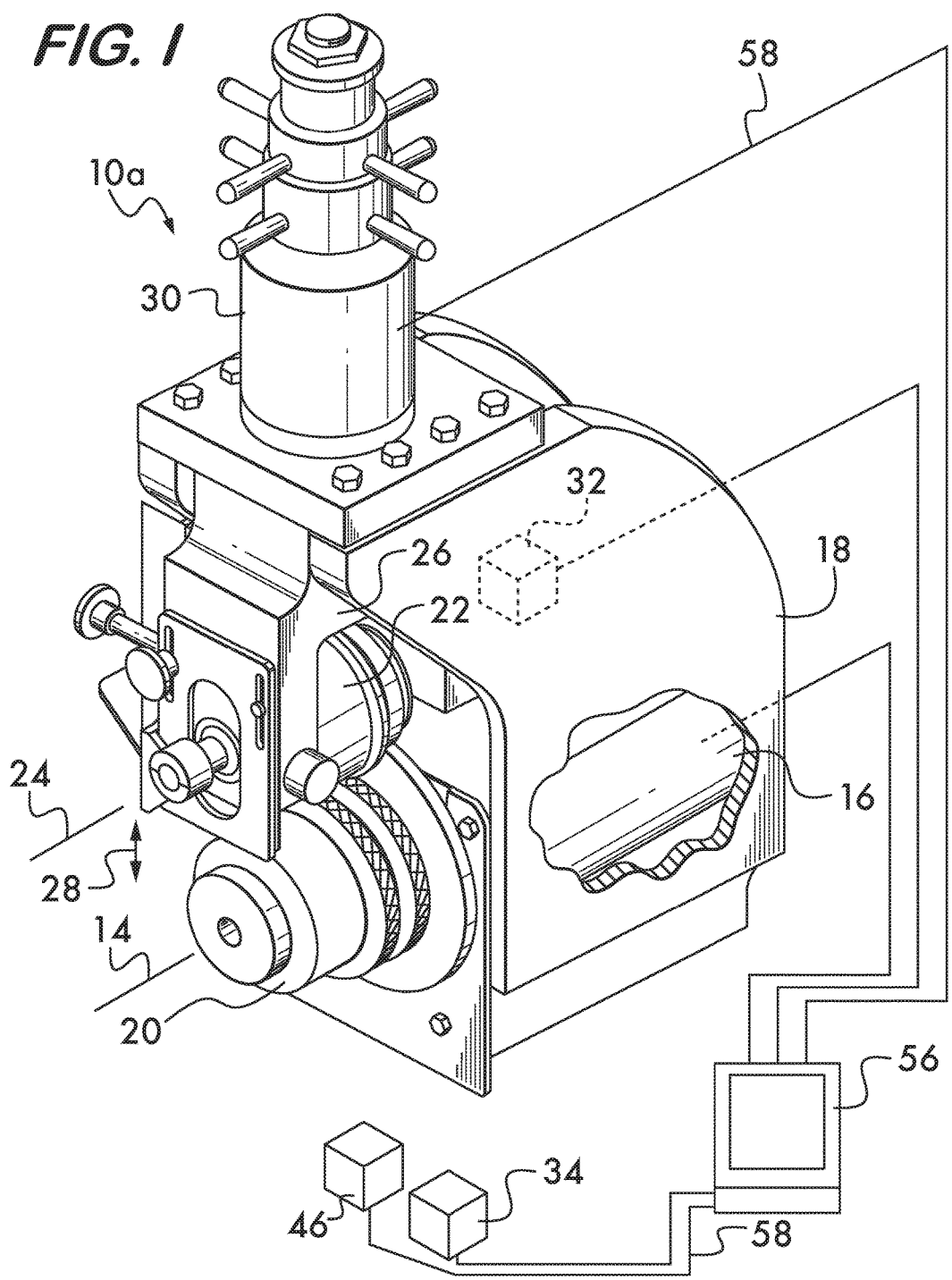
FIGS. 1 and 1A are isometric views of example embodiments of devices for forming circumferential grooves in pipe elements.

FIG. 1 shows an example embodiment of a device 10 for forming a circumferential groove in a pipe element. Device 10 comprises a drive roller 12 rotatable about an axis 14. In this example, drive roller 12 is rotated about axis 14 by an electric motor 16 positioned within a housing 18 on which the drive roller is mounted. Drive roller 12 has an outer surface 20 which is engageable with an inner surface of a pipe element as described below. An idler roller, which, in this example embodiment, is a grooving roller 22 is also mounted on housing 18 for rotation about an axis 24. Axes 14 and 24 are substantially parallel to one another which permit them to cooperate when forming a circumferential groove.

Grooving roller 22 is mounted to housing 18 via a yoke 26 which permits the grooving roller to be moved toward and away from the drive roller in the direction indicated by arrow 28 while maintaining axes 14 and 24 in substantially parallel relationship. Movement of the yoke 26 and hence the grooving roller 22 is effected by an actuator 30. Hydraulic actuators are advantageous because they provide a great range of high force adjustable in fine increments capable of locally yielding the pipe material to progressively form the groove. Other types of actuators are of course feasible.

Figure 2:
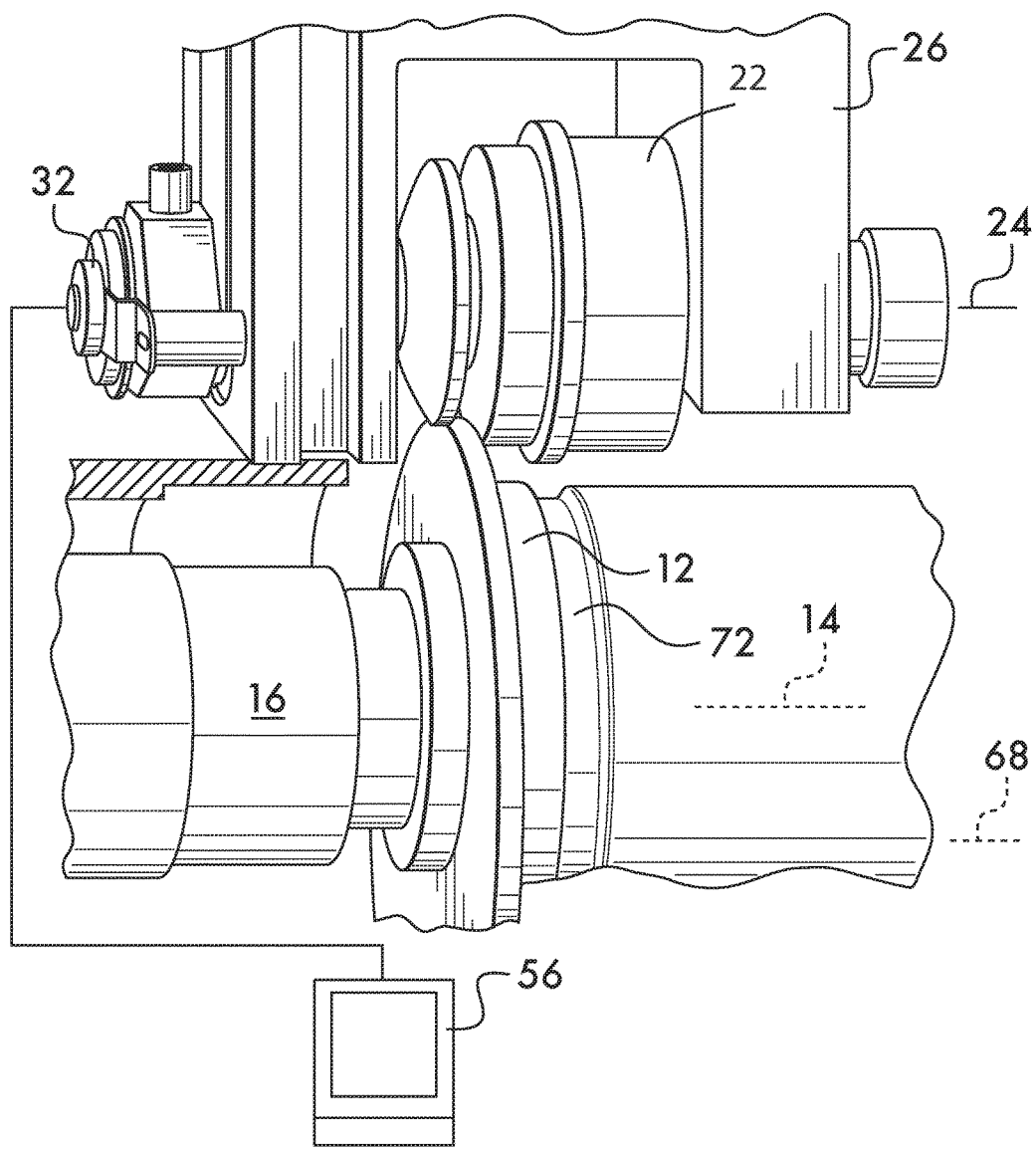
FIG. 2 is an isometric view of a portion of the device shown in FIG. 1.

As shown in FIG. 2, the device also includes a first sensor 32 for determining the degree of rotation of the grooving roller 22 about axis 24 during formation of the circumferential groove in the pipe element. In this example embodiment, the first sensor 32 comprises a rotary encoder. Rotary encoders are advantageous because they have excellent reliability, repeatability, accuracy and resolution, typically allowing a revolution to be divided into 600,060 discrete steps for great accuracy in measuring the rotation of the grooving roller 22. Rotary encoder model LM10IC005BB20F00 supplied by RLS of Ljubjana, Slovenia serves as a practical example appropriate for device 10.

In general, at least one revolution of the pipe element may be determined by sensing a feature on the pipe element a first and a second time while rotating the pipe element. The feature, for example, could be a naturally occurring feature, such as a unique scratch, tool marking, seam or other feature which is not placed on the pipe for any particular purpose. However, it is advantageous to position a feature on the pipe element which will be readily detectable so as to ensure reliable and accurate determination of a revolution of the pipe element. Two examples are described below, it being understood that other detection methods are also feasible.

Figure 3:
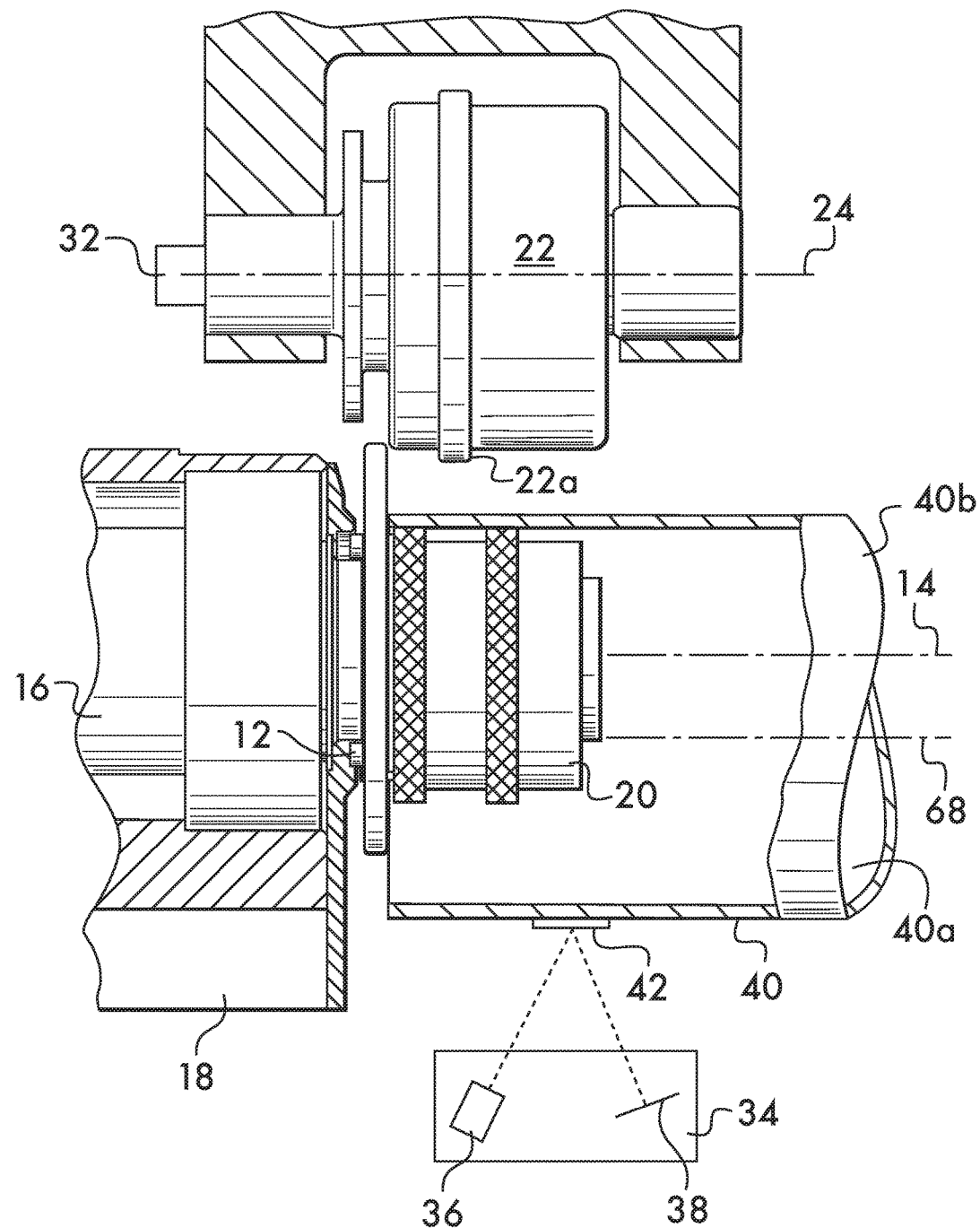
FIGS. 3, 3A, 4 and 5 are sectional views of a portion of the device shown in FIG. 1.

With reference again to FIG. 1, device 10 comprises a second sensor 34 for determining the degree of rotation of the pipe element. FIG. 3 shows an example of second sensor 34 which comprises a light projector 36, for example, a laser, a detector 38, which detects light from the projector as it is reflected from the pipe element 40, and a light reflecting surface 42 which is affixed to the outer surface 40b of the pipe element 40. Light reflecting surface 42 may be specular, diffuse, or have a different color from that of the outer surface 40b of the pipe element 40 and thus provides a contrast with the pipe element outer surface. Sensor 34 is also known as a contrast sensor because the detector 38 detects the difference between projected light reflected from the pipe outer surface 40b and the contrasting light reflecting surface 42. Contrast sensors such as 34 are manufactured by Leuze Electronics of New Hudson, Mich., with model number HRTL 3B/66-S8 being feasible for the device 10 disclosed herein. Each time the light reflecting surface 42 passes beneath light from projector 36 the detector detects the reflection therefrom and generates a signal which can be used to detect and count the revolutions of the pipe element.

Figure 3A:
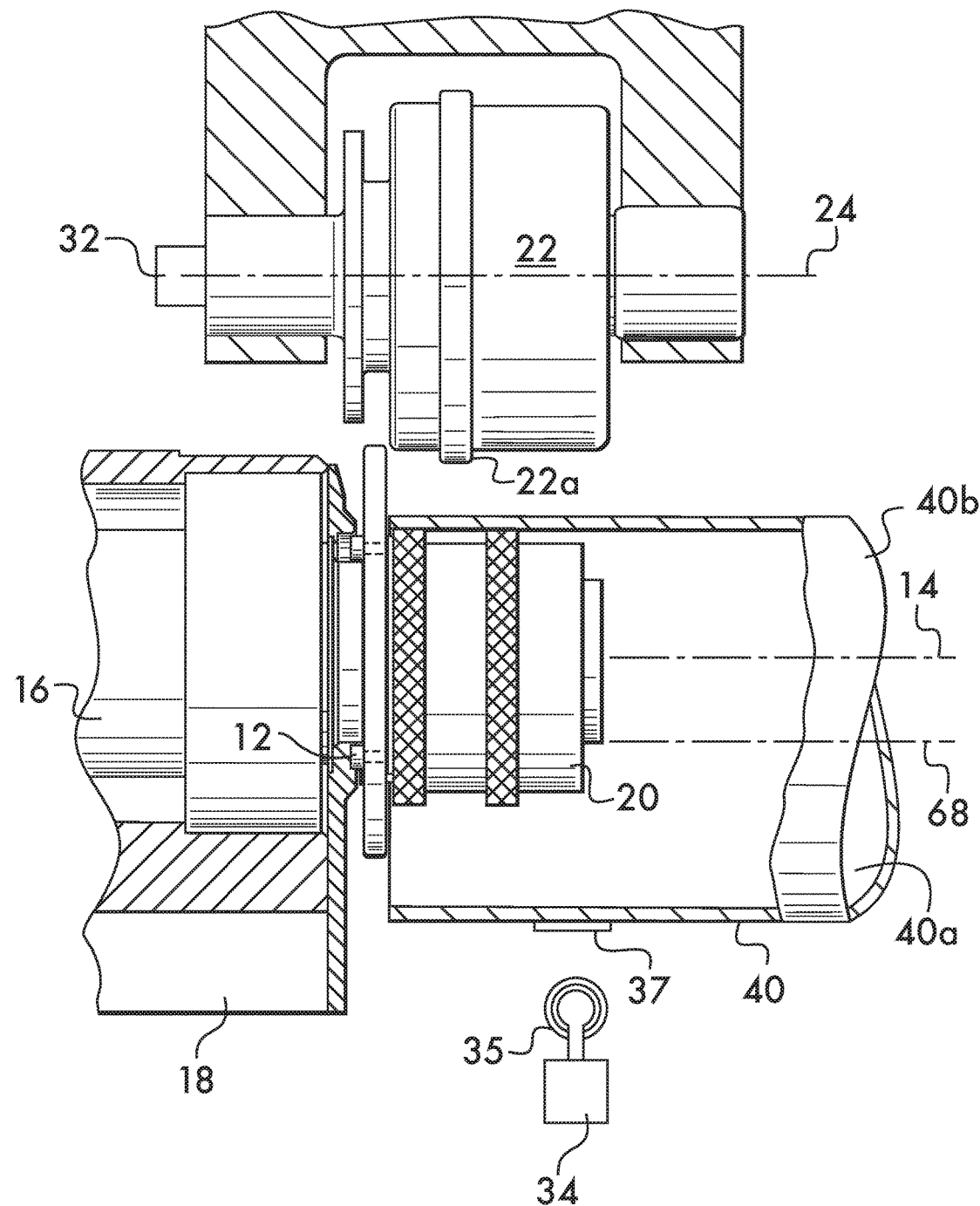

In an alternate embodiment, shown in FIG. 3A, the second sensor 34 may comprise a magnetic sensor 35. Magnetic sensor 35 is also a non-contact proximity sensor which uses inductive or capacitive principles to sense the passing of a magnet 37 affixed to a surface, for example, the outer surface 40b of the pipe element 40. Each time the magnet 37 passes the magnetic sensor 35 it generates a signal which can be used to detect and count the revolutions of the pipe element.

Figure 7:
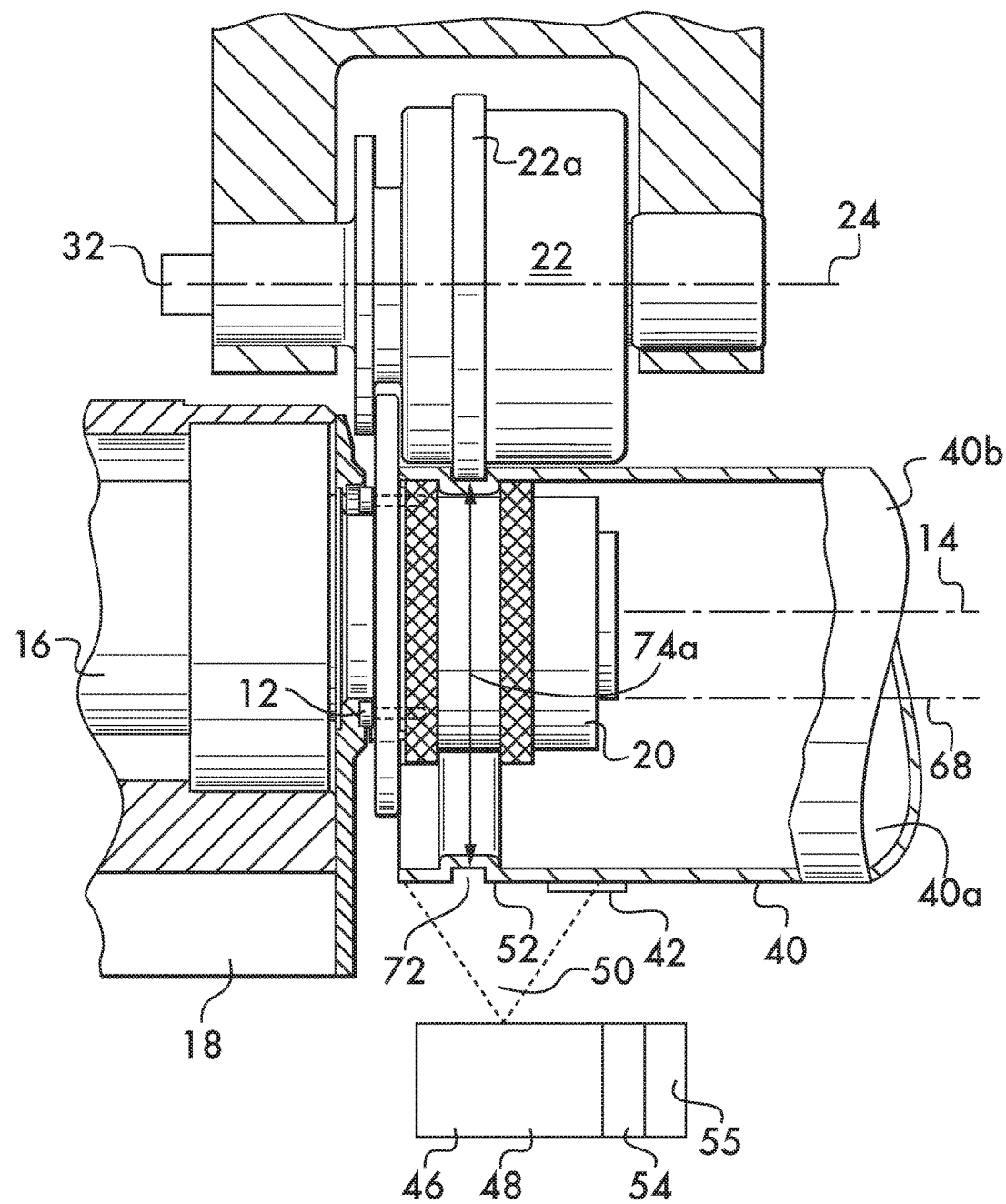
FIG. 7 is a sectional view of the portion of the device shown in FIG. 1.

As shown in FIG. 1, device 10 may also have a third sensor 46 for measuring a surface profile of at least a portion of the pipe element. As shown in FIG. 7, the third sensor 46 is a triangulation sensor and comprises a laser 48 adapted to produce a fan-shaped beam 50 along a portion of the outer surface 40b of the pipe element 40 where the profile 52 is to be measured. A detector 54 is adapted to receive the reflection of the fan-shaped beam from the outer surface portion of the pipe element. The third sensor 46 also includes a calculator unit 55 which uses triangulation to convert the reflection of the fan-shaped beam into measurements representing the outer surface profile.

With reference again to FIG. 1, device 10 also includes a control system 56. Control system 56 is in communication with the sensors 32, 34 and 46 as well as with the electrical motor 16 and the actuator 30. Communication may be through dedicated electrical lines 58. The control system receives signals generated by the sensors 32, 34 and 46 and sends commands to the actuator 30 and the motor 16 to control operation of the various parts of the device 10 to form the groove in the pipe elements. Sensor 32 generates signals indicative of the rotation of the grooving roller 22; sensor 34 generates signals indicative of the rotation of the pipe element 40 (see also FIG. 3); and sensor 46 generates signals indicative of the outer surface profile of the pipe element 40 (see also FIG. 7). These signals are transmitted to the control system. Control system 56 may comprise a computer or programmable logic controller having resident software which interprets the signals from the sensors 32, 34 and 46 and then issues commands to the actuator 30 and the motor 16 to effect the various functions associated with forming the circumferential grooves in the pipe elements. Together the control system 56, actuator 30, motor 16 and sensors 32, 34 and 46 operate in a feed-back loop to automatically form the grooves in an operation described below.

Figure 1A:
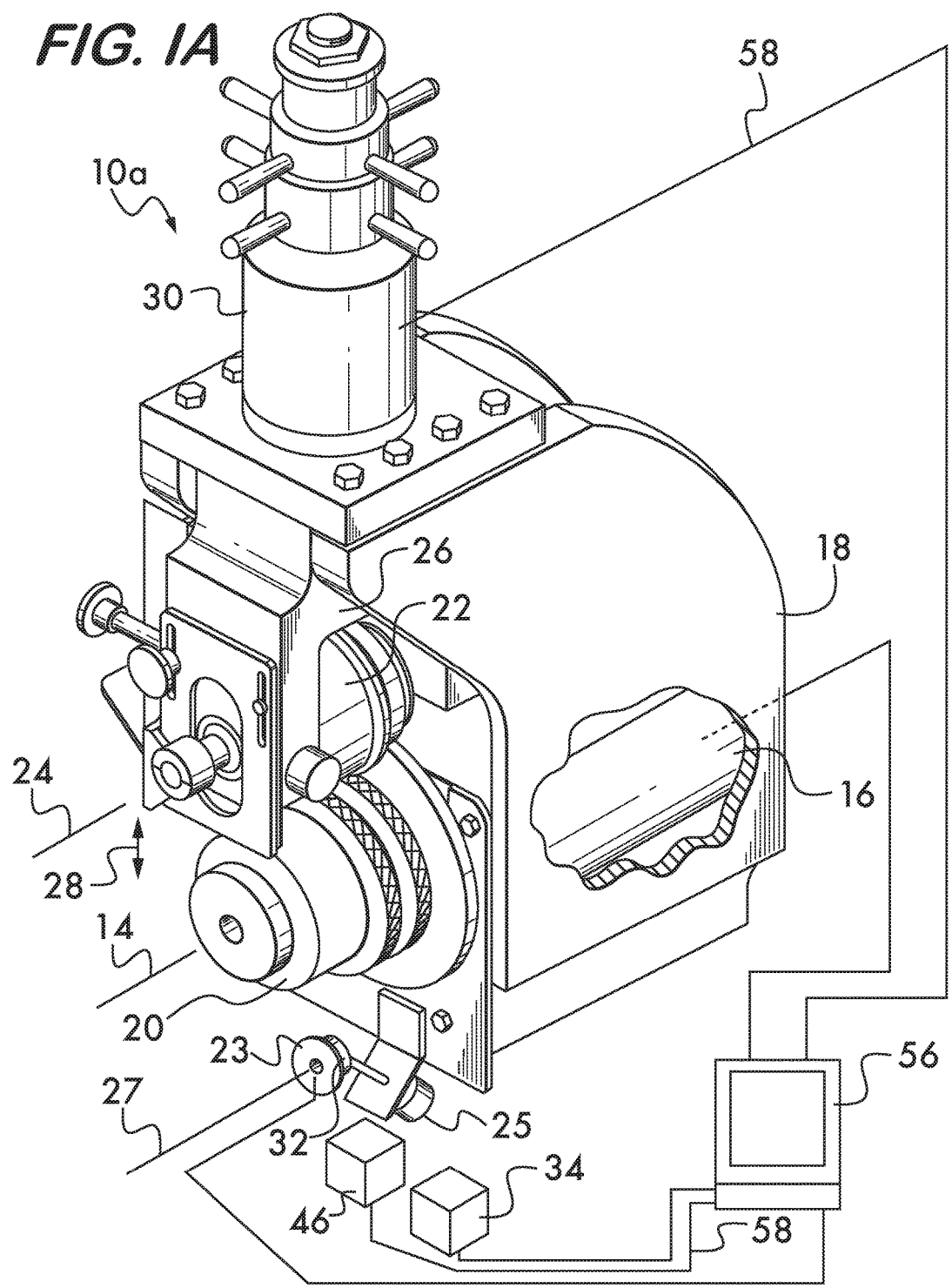

FIG. 1A shows a device 10a having a second idler roller 23 that is separate from the idler roller 22. In this example embodiment, idler roller 22 is a grooving roller mounted on yoke 26 as described above, and second idler roller 23 is mounted on an actuator 25 which is mounted on device 10a. Actuator 25 is controlled by control system 56 and moves the idler roller 23 toward and away from the drive roller 12 to engage and disengage the idler roller 23 with the pipe element. Idler roller 23 is rotatable about an axis 27 substantially parallel to axis 14 and will rotate about axis 27 when engaged with a pipe element that is mounted on and rotated by the drive roller 12. In this embodiment, the idler roller 23 is used to determine the pipe element diameter and the groove diameter, and the idler (grooving) roller 22 is used to support the pipe element and form a circumferential groove. To that end, first sensor 32 is operatively associated with the idler roller 23 and used to determine the degree of rotation of the idler roller 23 about axis 27 during determination of the pipe element diameter and formation of the circumferential groove in the pipe element. In this example embodiment, the first sensor 32 may again comprise a rotary encoder as described above. The rotary encoder counts the number of revolutions and fractions thereof of the idler roller 23 and generates a signal indicative thereof which is transmitted to the control system 56 via a communication link such as hardwired lines 58. The control system 56 uses the information transmitted in the signals to determine the diameter of the pipe element and control the machine operation during groove formation as described below.

Device Operation

Figure 6:
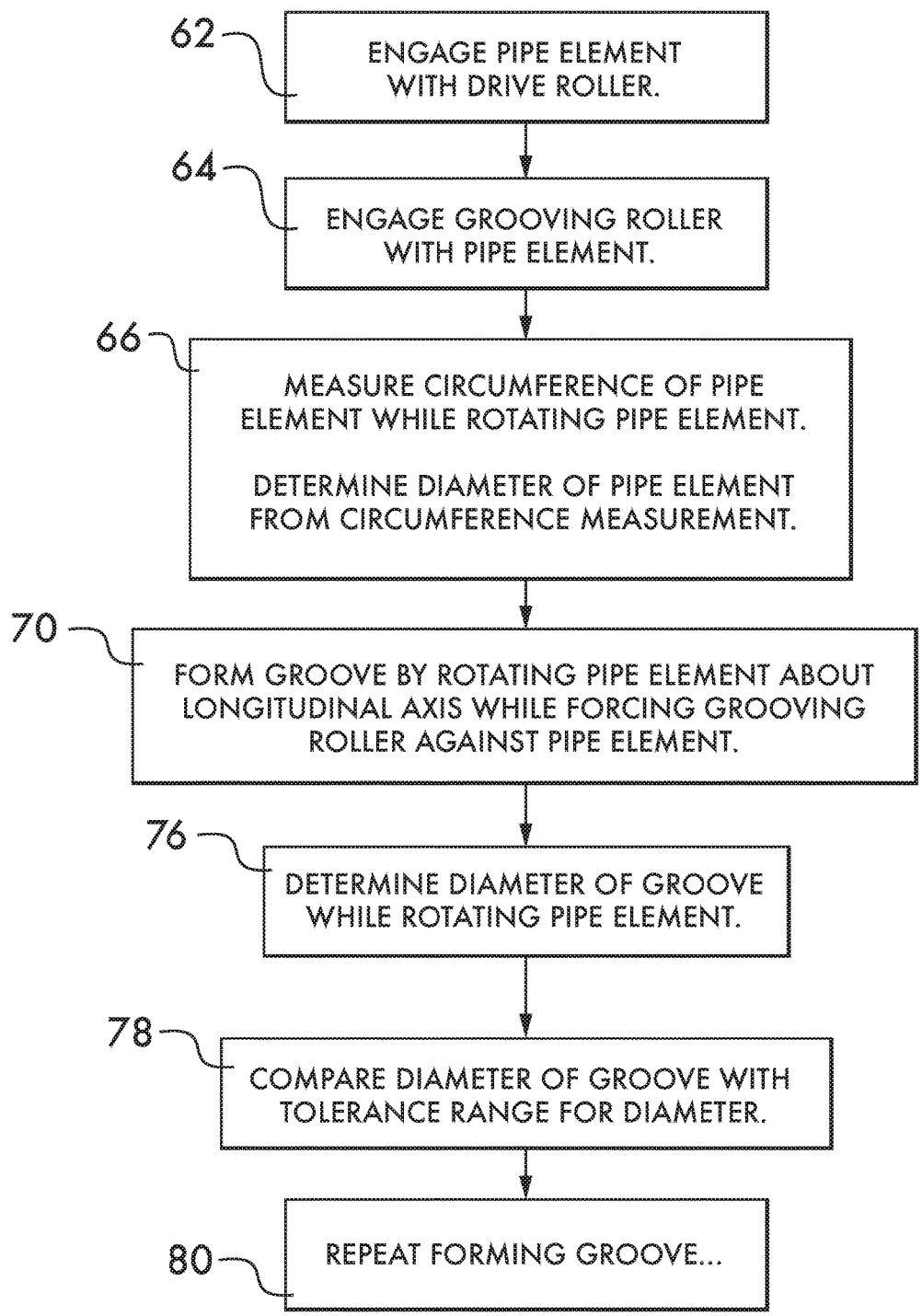
FIG. 6 is a flow chart illustrating an example method of forming a circumferential groove in a pipe element.

An example method of forming a circumferential groove in a pipe element using the device 10 is illustrated in FIGS. 1-5 and in the flow chart of FIG. 6. As shown in FIG. 3, pipe element 40 is engaged with the drive roller 12 (see box 62, FIG. 6). In this example, the inner surface 40a of the pipe element 40 is placed in contact with the drive roller. Next, as described in box 64 of FIG. 6, grooving roller 22 is moved by the actuator 30 (under the command of control system 56) toward the drive roller 12 until it engages the outer surface 40b of pipe element 40. It is advantageous to pinch pipe element 40 between the drive roller 12 and the grooving roller 22 with sufficient force to securely hold the pipe element on the device 10. At this point, it is possible to determine the diameter of the pipe element 40 in order to either accept the pipe element and form the circumferential groove, or reject the pipe element because its diameter is outside of the accepted tolerance range and thus be incompatible with other pipe elements of the same nominal size. Determining the pipe element diameter is represented by box 66 in FIG. 6 and is effected by measuring the circumference of the pipe while rotating the pipe element 40 about its longitudinal axis 68 using drive roller 12 powered by motor 16. Drive roller 12 in turn, rotates pipe element 40, which causes grooving roller 22 to rotate about its axis 24. For greater accuracy of the measurement, it is advantageous if grooving roller 22 rotates in response to pipe element 40 without slipping. The diameter of pipe element 40 may then be calculated by knowing the diameter of the surface 22a of the grooving roller 22 that is in contact with the pipe element 40, and counting the number of revolutions of the grooving roller, including fractions of a rotation, for each revolution of the pipe element. If the diameter D of the grooving roller surface 22a is known, then the circumference C of the pipe element 40 can be calculated from the relation $C=(D \times rev \times \Pi)$ where "rev" equals the number of revolutions of the grooving roller 22 (including fractions of a rotation) for one revolution of the pipe element. Once the circumference C of the pipe element is known, the pipe element diameter d can be calculated from the relation $d=C/\Pi$.

In device 10, sensor 32, for example, a rotary encoder, counts the number of revolutions and fractions thereof (rev) of the grooving roller 22 and generates a signal indicative thereof. Each revolution of the pipe element 40 is detected and/or counted by the sensor 34, which generates signals indicative thereof. For example, if sensor 34 is a contrast sensor as described above (see FIG. 3), it senses a first and a second reflection from the light reflecting surface 42, which indicate it has detected or counted one revolution of the pipe element. If sensor 34 is a magnetic sensor (FIG. 3A), it senses a first and a second magnetic field, which indicates that it has detected or counted one revolution of the pipe element. Signals from the sensor 32 and the sensor 34 are transmitted to the control system 56, which performs the calculations to determine the diameter of the pipe element 40. The control system may then display the pipe element diameter to an operator for acceptance or rejection, or, the control system itself may compare the pipe element diameter with a tolerance range for pipes of a known nominal size and display an "accept" or "reject" signal to the operator. Note that for such automated operation the control system is programmed with dimensional tolerance data for pipe elements of various standard sizes. The operator must mount the grooving roller appropriate for the standard pipe size and groove being formed and input to the control system the particular standard pipe elements being processed. In response to these inputs the resident software within the control system will then use the proper reference data to determine if the pipe element has a diameter which falls within the acceptable tolerance range for pipe elements of the selected standard size.

Figure 4:
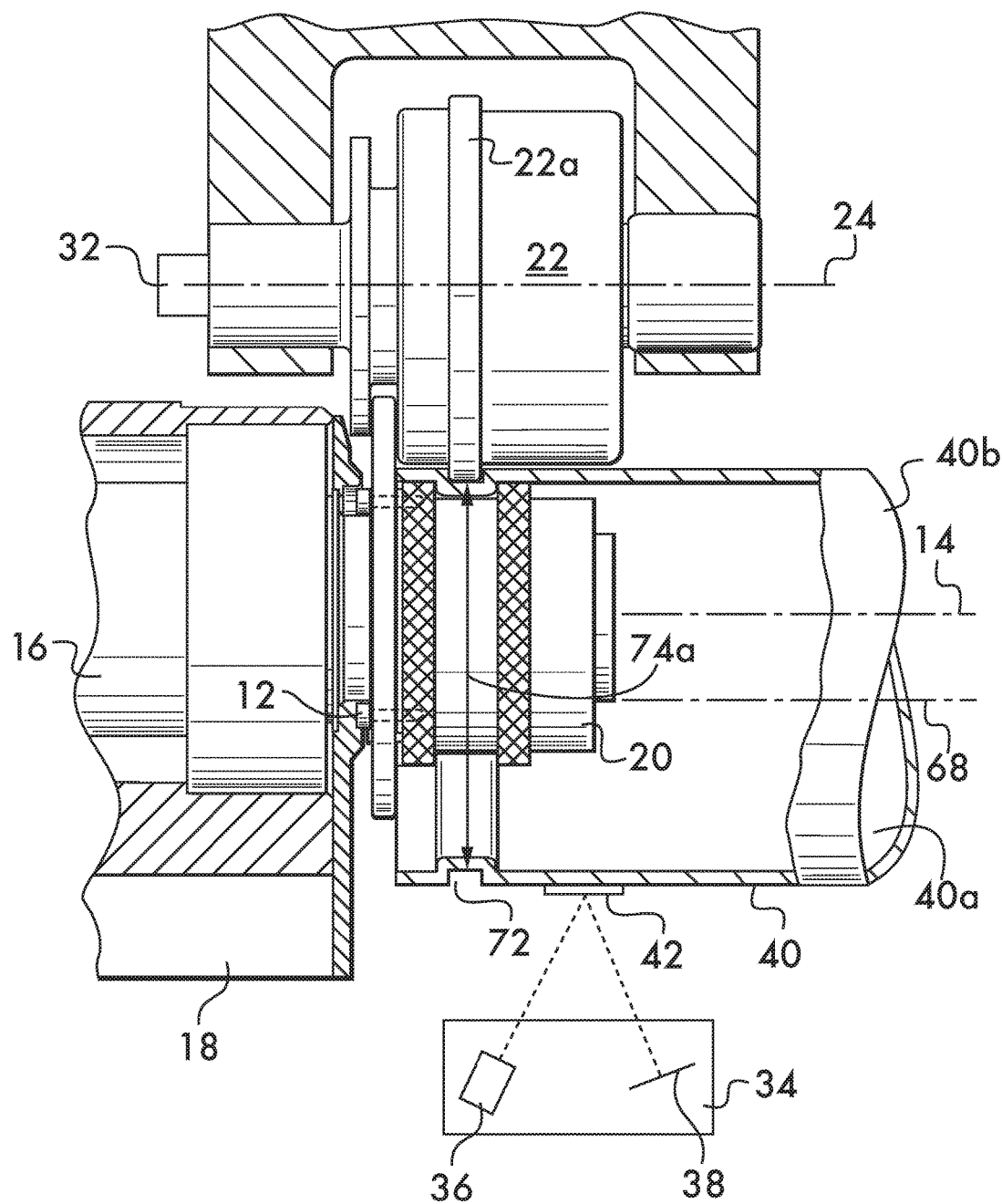
Figure 5:
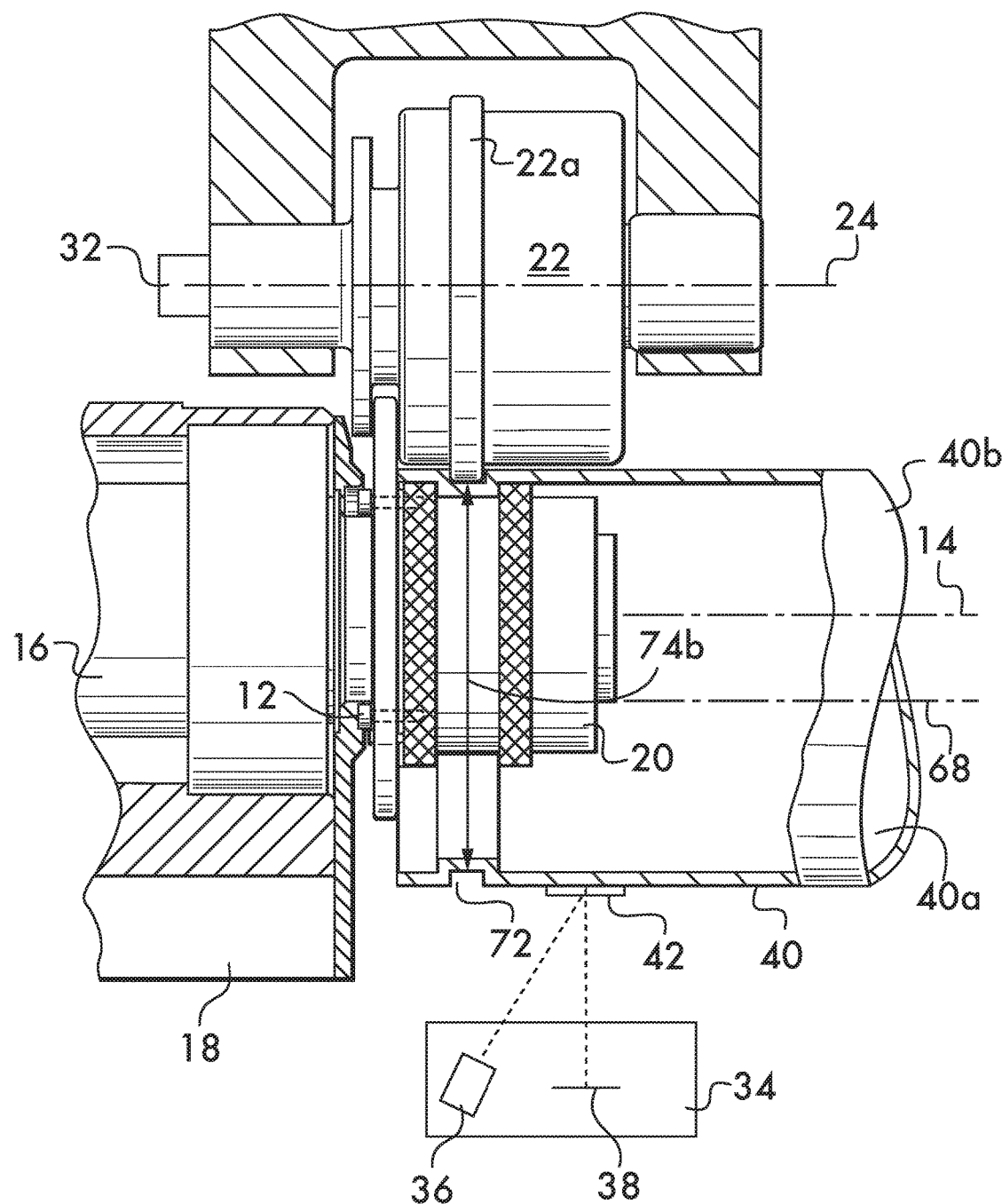

Box 70 of FIG. 6 and FIG. 4 illustrate forming of a groove 72 in pipe element 40. Drive roller 12 is rotated, thereby rotating pipe element 40 about its longitudinal axis 68, which rotates the grooving roller 22 about axis 24. Note that the axis of rotation 14 of the drive roller 12, the axis of rotation 24 of the grooving roller 22 and the longitudinal axis 68 of the pipe element 40 are substantially parallel to one another. "Substantially parallel" as used herein means within about 2 degrees so as to permit rotation without significant friction but also allow for tracking forces to be generated which maintain the pipe element engaged with the drive and grooving rollers during rotation. During rotation of the pipe element, the actuator 30 (FIG. 1) forces the grooving roller 22 against the pipe element 40, thereby cold working the pipe element, displacing the pipe element material, and forming the circumferential groove 72. Note that the force exerted by the actuator 30, as well as the feed rate of the grooving roller 22 (i.e., the rate at which the grooving roller moves toward the drive roller) and the rotational speed of the pipe element may be selected based upon one or more characteristics of the pipe element 40. Such characteristics include, for example, the pipe element diameter, the wall thickness (schedule), and the material comprising the pipe element. Selection of the operational parameters such as force, feed rate and rotational speed may be established by the operator, or, by the control system 56 in response to inputs from the operator specifying the particular pipe being processed. For example, the control system may have a database of preferred operational parameters associated with particular standard pipe elements according to diameter, schedule and material.

For compatibility of the pipe element 40 with mechanical couplings, it is necessary that the final diameter 74b (see FIG. 5) of the groove 72 be within an acceptable tolerance for the particular diameter pipe element being processed. As indicated in box 76 (see also FIG. 4), to produce an acceptable groove 72, the instantaneous groove diameter 74a (i.e., the groove diameter before it achieves its final diameter) is determined at intervals while the pipe element 40 is rotating. The instantaneous groove diameter 74a, as shown in FIG. 4, is determined using signals from the sensor 32 and the sensor 34 as described above for determining the diameter of the pipe element 40 (FIG. 6, box 66). Signals from the sensor 32, indicative of the number of revolutions (and fractions thereof) of the grooving roller 22, and signals from the sensor 34, indicative of the number of revolutions of the pipe element constitute a measurement of the instantaneous circumference of the pipe element 40 within groove 72. These signals are transmitted to the control system 56 which uses the information in the signals to determine (i.e., calculate) the instantaneous diameter 74a of the groove 72 (note that the diameter of the surface 22a of the grooving roller 22 forming the groove is known). As shown in Box 78, the control system then compares the instantaneous diameter of the groove with the appropriate tolerance range for groove diameters for the particular pipe being processed. As shown in Box 80, if the instantaneous groove diameter is not within the appropriate tolerance range, for example, the instantaneous groove diameter is larger than the largest acceptable diameter for the particular pipe element being processed, then the control system 56 continues to form the groove 72 by rotating the pipe element 40 about its longitudinal axis 68 while forcing the grooving roller 22 against the pipe element so as to displace material of the pipe element, determining the instantaneous diameter 74a of the groove 72 while rotating the pipe element 40, and comparing the instantaneous diameter of the groove with the tolerance range for the diameter of the groove until the groove diameter is within the tolerance range acceptable for the diameter of the groove.

Once the final groove diameter 74b is at a predetermined target diameter the control system 56 halts the motion of the grooving roller 22 toward the drive roller 12, but continues rotation of the pipe element for at least one full rotation to ensure a uniform grooving depth. The rotation is then halted and the grooving roller 22 is moved away from the drive roller 12 so that the pipe element 40 may be removed from the device 10.

Another example method of forming a circumferential groove in a pipe element is described using the device 10a shown in FIG. 1A. This embodiment has two separate idler rollers, idler roller 22, which is a grooving roller, and idler roller 23, which is a measuring roller. As described above, the pipe element is engaged with the drive roller 12 (see box 62, FIG. 6). Next, as described in box 64 of FIG. 6, grooving roller 22 is moved by the actuator 30 (under the command of control system 56) toward the drive roller 12 until it engages the outer surface of the pipe element. It is advantageous to pinch pipe element between the drive roller 12 and the grooving roller 22 with sufficient force to securely hold the pipe element on the device 10. Control system 56 also commands actuator 25 to move idler roller 23 into engagement with the outer surface of the pipe element. At this point, it is possible to determine the diameter of the pipe element in order to either accept the pipe element and form the circumferential groove, or reject the pipe element because its diameter is outside of the accepted tolerance range and thus would be incompatible with other pipe elements of the same nominal size. Determining the pipe element diameter is represented by box 66 in FIG. 6 and is effected by measuring the circumference of the pipe element while rotating it about its longitudinal axis using drive roller 12 powered by motor 16. Drive roller 12 in turn, rotates the pipe element, which causes idler roller 23 to rotate about its axis 27. For greater accuracy of the measurement, it is advantageous if idler roller 23 rotates in response to the pipe element without slipping. The diameter of the pipe element may then be calculated by knowing the diameter of the surface of the idler roller 23 that is in contact with the pipe element, and counting the number of revolutions of the idler roller 23, including fractions of a rotation, for each revolution of the pipe element. If the diameter D of the idler roller 23 is known, then the circumference C of the pipe element can be calculated from the relation $C=(D \times rev \times \Pi)$ where "rev" equals the number of revolutions of the idler roller 23 (including fractions of a rotation) for one revolution of the pipe element. Once the circumference C of the pipe element is known, the pipe element diameter d can be calculated from the relation $d=C/\Pi$.

In device 10a, sensor 32, for example, a rotary encoder, counts the number of revolutions and fractions thereof of the idler roller 23 and generates a signal indicative thereof. Each revolution of the pipe element is detected and/or counted by the sensor 34 (for example, a contrast sensor or a magnetic sensor), which generates signals indicative thereof. Signals from the sensor 32 and the sensor 34 are transmitted to the control system 56, which performs the calculations to determine the diameter of the pipe element. The control system may then display the pipe element diameter to an operator for acceptance or rejection, or, the control system itself may compare the pipe element diameter with a tolerance range for pipes of a known nominal size and display an "accept" or "reject" signal to the operator.

Box 70 of FIG. 6 illustrates forming of a groove in pipe element. Drive roller 12 is rotated, thereby rotating the pipe element about its longitudinal axis, which rotates the grooving roller 22 about its axis 24 and the idler roller 23 about its axis 27. Note that the axis of rotation 14 of the drive roller 12, the axis of rotation 24 of the grooving roller 22, the axis of rotation 27 of the idler roller 23 and the longitudinal axis of the pipe element are substantially parallel to one another. During rotation of the pipe element, the actuator 30 forces the grooving roller 22 against the pipe element, thereby cold working the pipe element, displacing the pipe element material, and forming the circumferential groove. Also during rotation of the pipe element, the actuator 25 maintains the idler roller 23 in contact with the pipe element within the groove being formed by the grooving roller 22.

For compatibility of the pipe element with mechanical couplings, it is necessary that the final diameter of the groove be within an acceptable tolerance for the particular diameter pipe element being processed. As indicated in box 76, to produce an acceptable groove, the instantaneous groove diameter (i.e., the groove diameter before it achieves its final diameter) is determined at intervals while the pipe element is rotating. The instantaneous groove diameter is determined using signals from the sensor 32 and the sensor 34 as described above for determining the diameter of the pipe element (FIG. 6, box 66). Signals from the sensor 32, indicative of the number of revolutions (and fractions thereof) of the idler roller 23, and signals from the sensor 34, indicative of the number of revolutions of the pipe element, constitute a measurement of the instantaneous circumference of the pipe element within the groove being formed by the grooving roller 22. These signals are transmitted to the control system 56 which uses the information in the signals to determine (i.e., calculate) the instantaneous diameter of the groove (note that the diameter of the idler roller 23 in contact with the pipe element is known). As shown in Box 78, the control system then compares the instantaneous diameter of the groove with the appropriate tolerance range for groove diameters for the particular pipe being processed. As shown in Box 80, if the instantaneous groove diameter is not within the appropriate tolerance range, for example, the instantaneous groove diameter is larger than the largest acceptable diameter for the particular pipe element being processed, then the control system 56 continues to form the groove by rotating the pipe element about its longitudinal axis while forcing the grooving roller 22 against the pipe element so as to displace material of the pipe element, determining the instantaneous diameter of the groove (via the idler roller 23 and its associated sensor 32) while rotating the pipe element, and comparing the instantaneous diameter of the groove with the tolerance range for the diameter of the groove until the groove diameter is within the tolerance range acceptable for the diameter of the groove.

Once the final groove diameter is at a predetermined target diameter the control system 56 halts the motion of the grooving roller 22 toward the drive roller 12, but continues rotation of the pipe element for at least one full rotation to ensure a uniform grooving depth. The rotation is then halted and the grooving roller 22 and the idler roller 23 are moved away from the drive roller 12 so that the pipe element may be removed from the device 10*a*.

Figure 8:
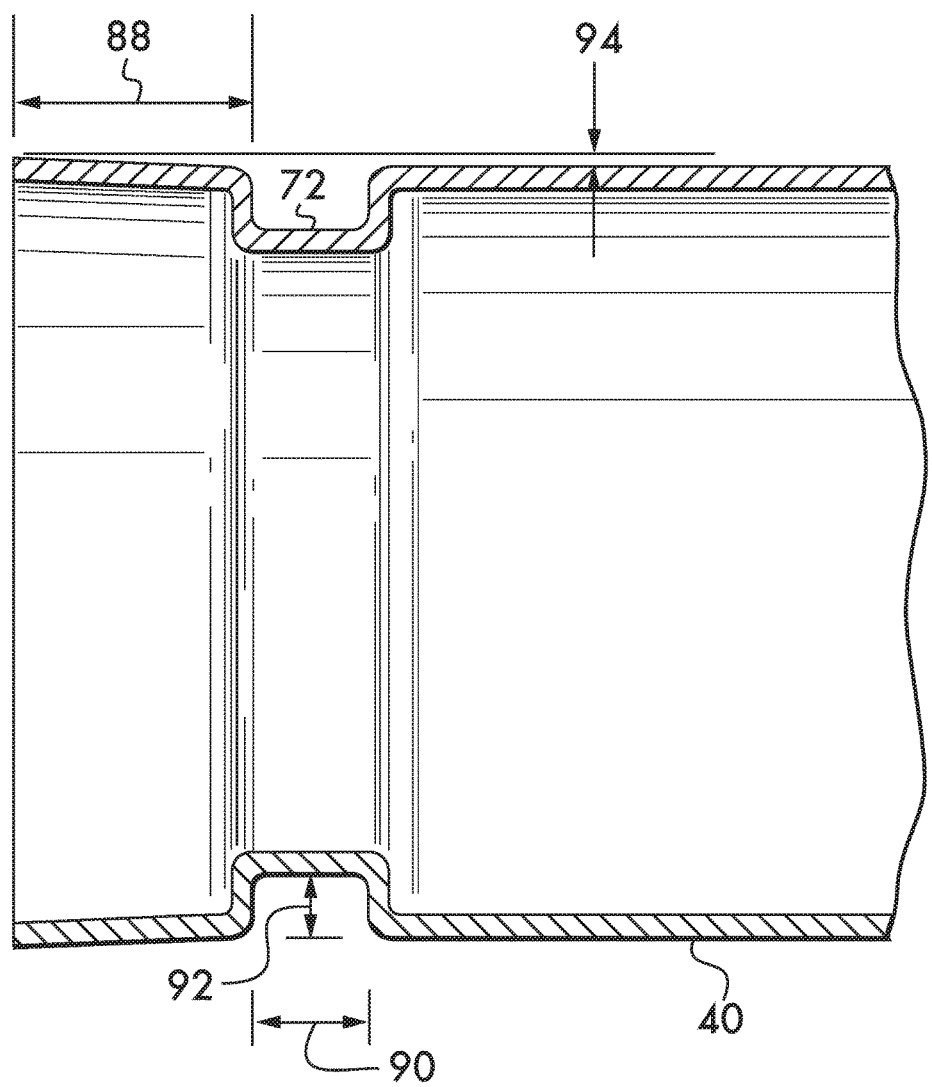
FIG. 8 is a longitudinal sectional view of a pipe element having a circumferential groove.

As shown in FIG. 7, the triangulation sensor 46 may also be used to measure a plurality of dimensions of the pipe element 40 proximate to the groove 72. As shown in FIG. 8, dimensions such as the distance 88 from the end of pipe 40 to the groove 72, the width 90 of the groove, the depth 92 of the groove, and the flare height 94 of the pipe element may be measured to create a profile of the pipe end. Flare may occur as a result of the grooving process and flare height is the height of the end of the pipe element above the pipe diameter. This information may be transmitted to the control system for comparison with acceptable tolerances for these dimensions for a standard pipe element.

Figure 9:
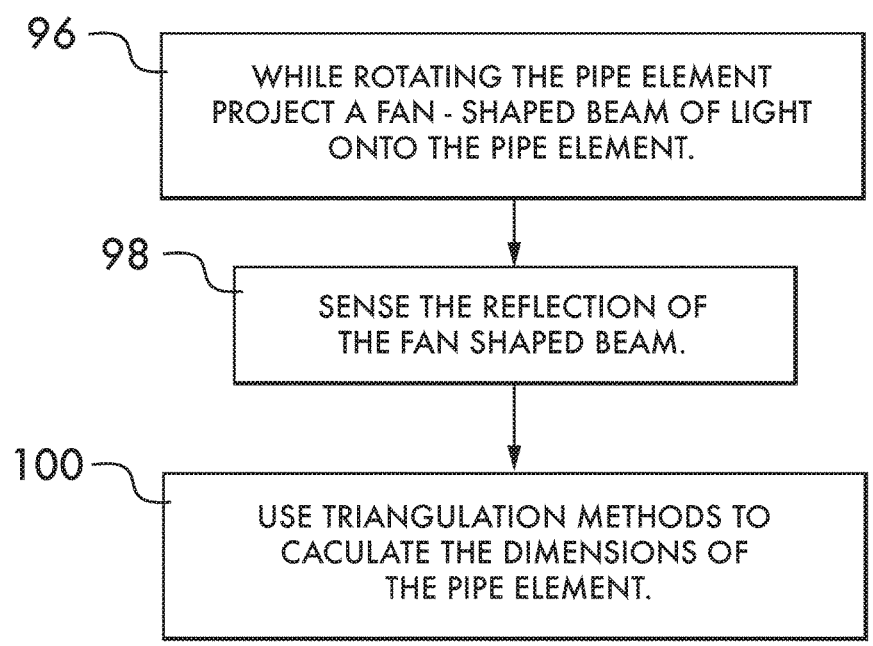

As depicted in FIGS. 7 and 9, measurement of the plurality of dimensions is effected while rotating the pipe element and comprises projecting a fan-shaped beam of light 50 along a length of the surface of the pipe element 40 which includes the circumferential groove 72 (see FIG. 9, box 96). The reflection of the beam 50 is detected by a sensor 54 (box 98). A calculator unit 55, operatively associated with the sensor 54 uses triangulation methods to calculate the dimensions of the region of the pipe element 40 swept by the beam 50 (box 100). The dimensional information is encoded into signals which are transmitted to the control system 56 (see FIG. 1), in this example over hardwired lines 58. The dimensional information thus acquired may be displayed and/or evaluated against a database to characterize the pipe element as processed.

Figure 10A:
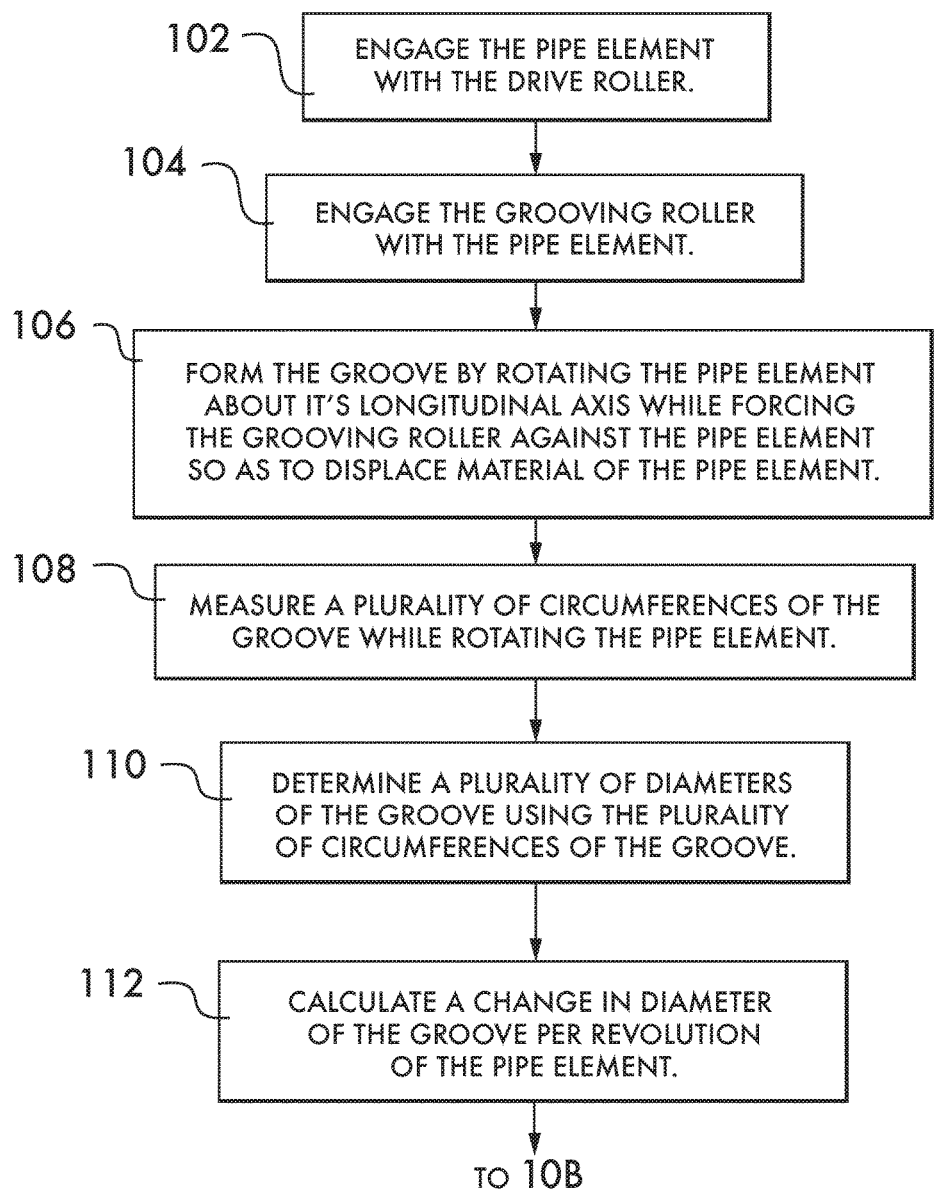
Figure 10B:
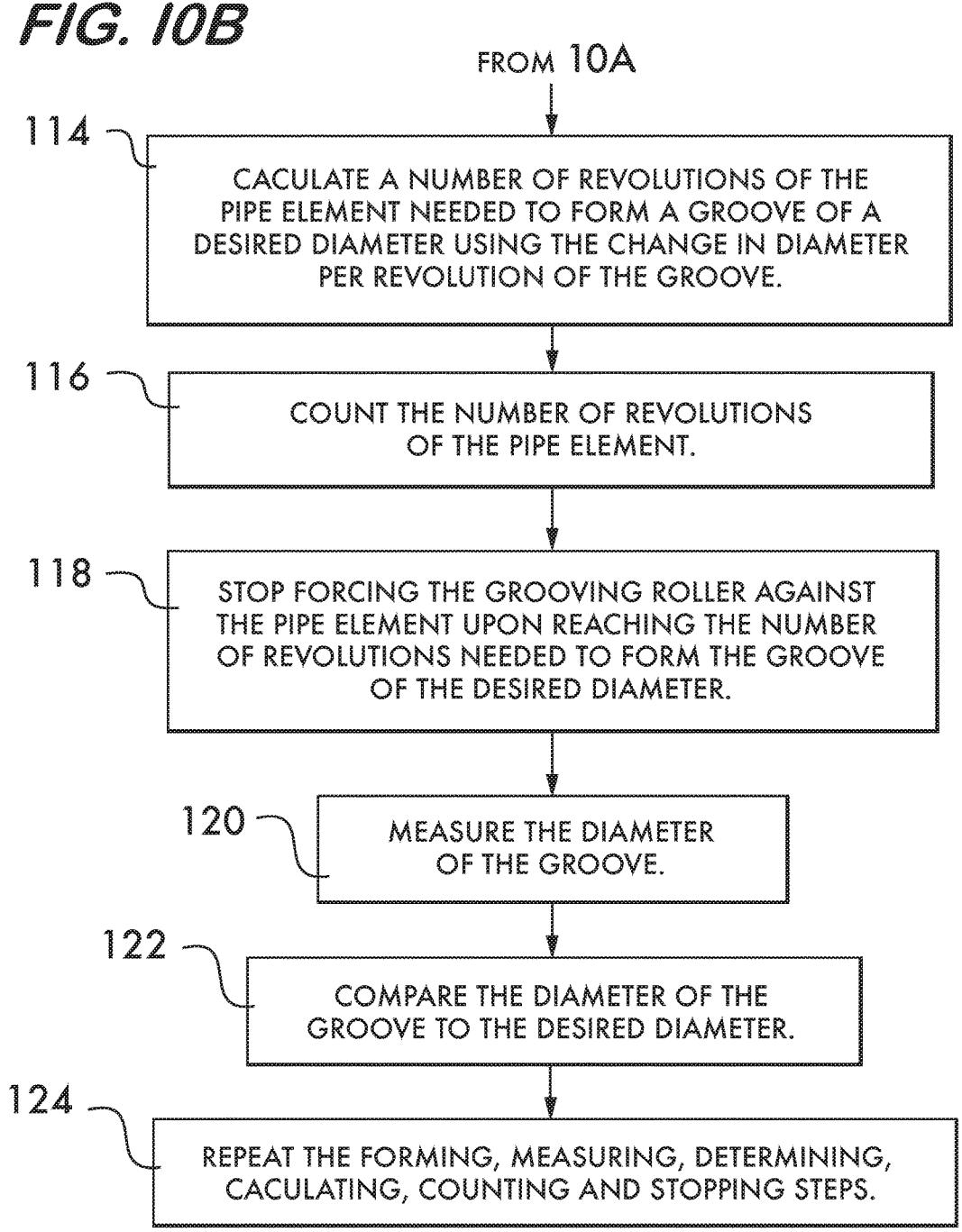

Another example method of forming a circumferential groove in a pipe element having a longitudinal axis and using a drive roller and a grooving roller is shown in FIG. 10. This example method comprises:

engaging the pipe element with the drive roller (box 102);

engaging the grooving roller with the pipe element (box 104);

forming the groove by rotating the pipe element about its longitudinal axis while forcing the grooving roller against the pipe element so as to displace material of the pipe element (box 106);

measuring a plurality of circumferences of the groove while rotating the pipe element (box 108);

determining a plurality of diameters of the groove using the plurality of circumferences of the groove (box 110);

calculating a change in diameter of the groove per revolution of the pipe element (box 112);

calculating a number of revolutions of the pipe element needed to form a groove of a desired diameter using the change in diameter per revolution of the groove (box 114);

counting the number of revolutions of the pipe element (box 116); and stopping forcing the grooving roller against the pipe element upon reaching the number of revolutions needed to form the groove of the desired diameter (box 118).

The method shown in FIG. 10 is a predictive method which uses the rate of change of the diameter per revolution of the pipe element to predict when to stop forming the groove by displacing the material of the pipe element. As it is possible that the prediction might not yield as precise a groove diameter as desired, additional steps, shown below, may be advantageous:

measuring the diameter of the groove (box 120);

comparing the diameter of the groove to the desired diameter (box 122);

repeating the forming, measuring, determining, calculating, counting and stopping steps (box 124).

Figure 11A:
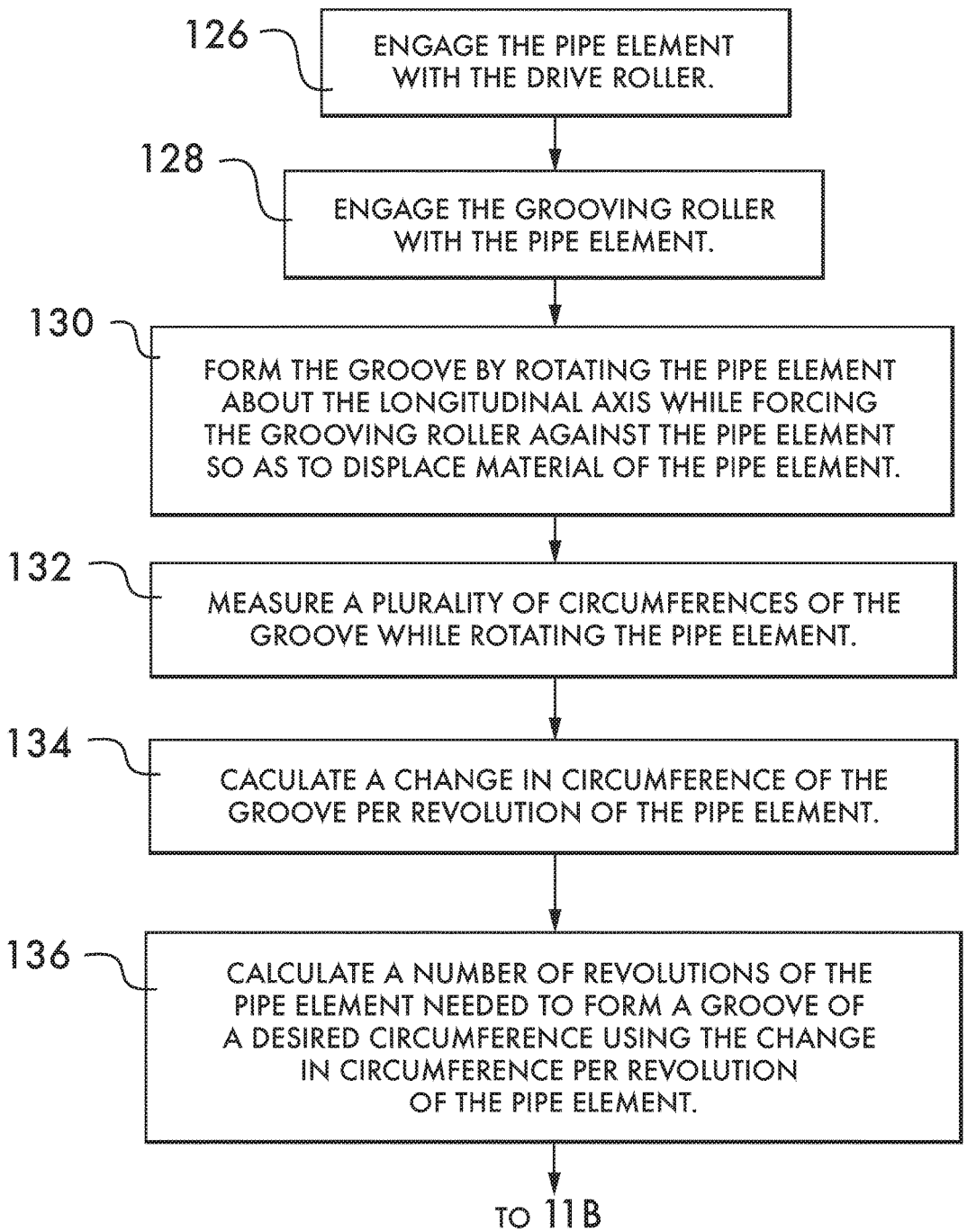
Figure 11B:
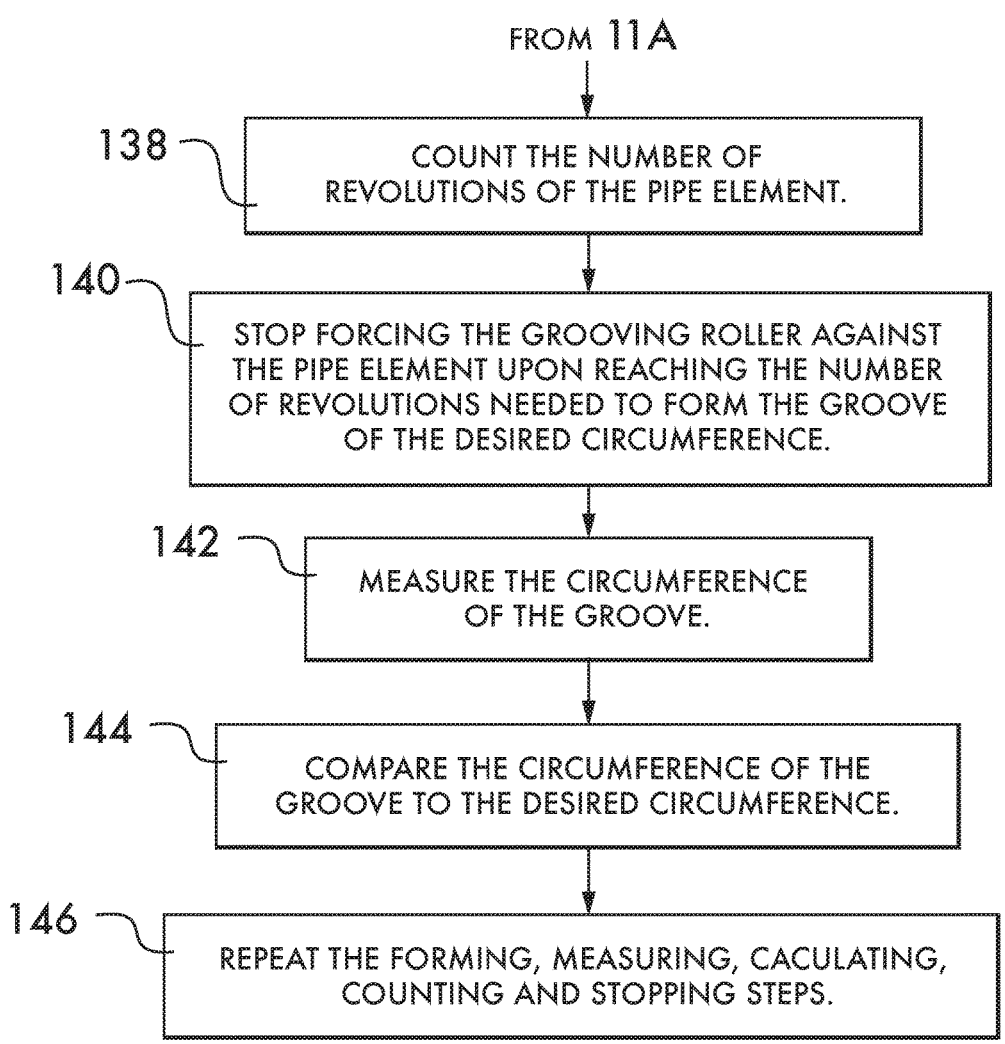

FIG. 11 shows a similar predictor-corrector method of forming the groove. However, this method is based upon the circumference of the groove, not the diameter. In a particular example the method comprises:

engaging the pipe element with the drive roller (box 126);

engaging the grooving roller with the pipe element (box 128);

forming the groove by rotating the pipe element about the longitudinal axis while forcing the grooving roller against the pipe element so as to displace material of the pipe element (box 130);

measuring a plurality of circumferences of the groove while rotating the pipe element (box 132);

calculating a change in circumference of the groove per revolution of the pipe element (box 134);

calculating a number of revolutions of the pipe element needed to form a groove of a desired circumference using the change in circumference per revolution of the pipe element (box 136);

counting the number of revolutions of the pipe element (box 138); and stopping forcing the grooving roller against the pipe element upon reaching the number of revolutions needed to form the groove of the desired circumference (box 140).

Again, in order to account for imprecise groove formation using the prediction, the following steps may be added:

measuring the circumference of the groove (box 142);

comparing the circumference of the groove to the desired circumference (box 144);

repeating the forming, measuring, calculating, counting and stopping steps (box 146).

Figure 12:
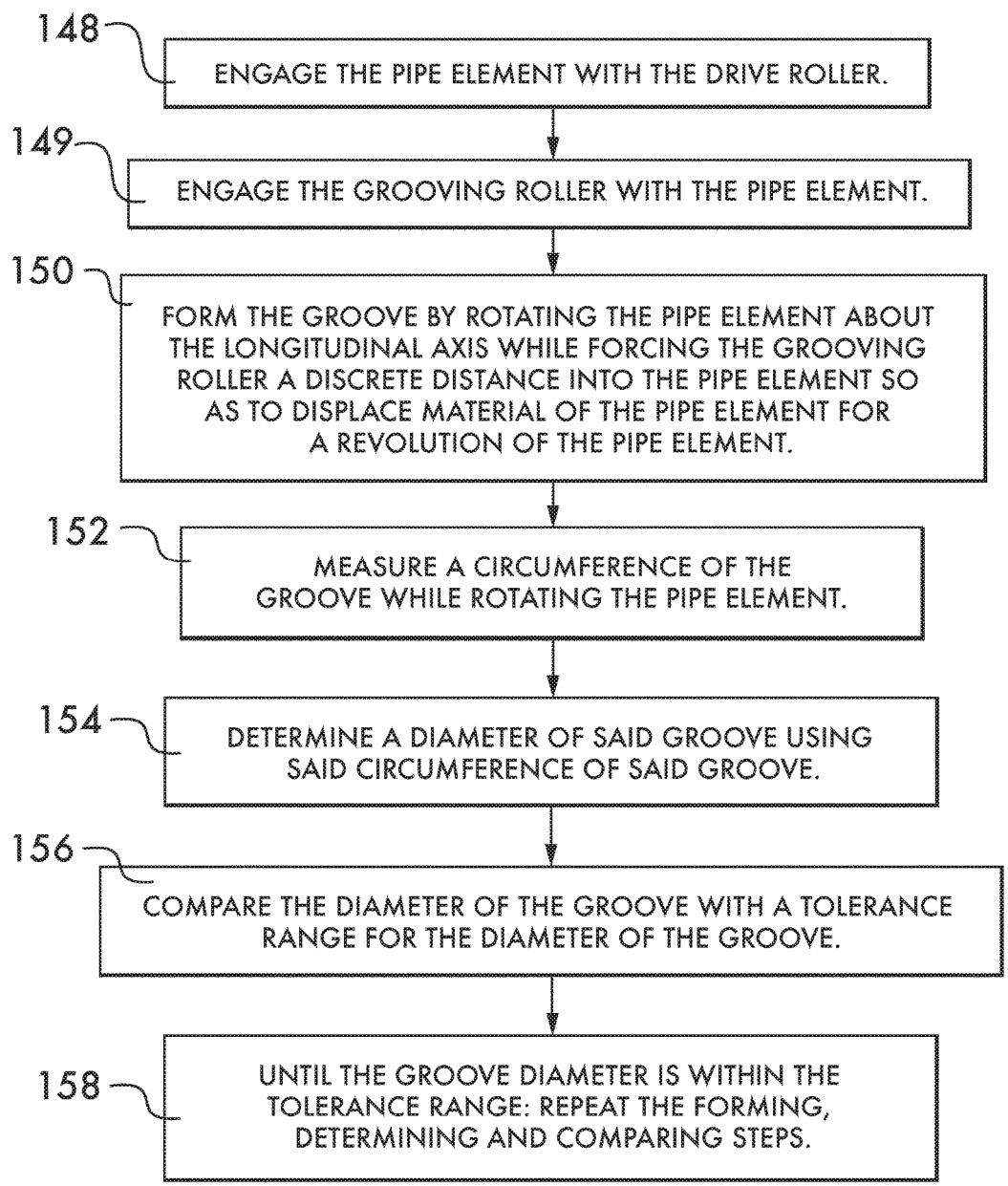

The methods thus far described use substantially continuous feed of the grooving roller toward the pipe element. However, there may be advantages in efficiency and precision if the grooving roller is advanced in discrete increments as described in the method shown in FIG. 12 and described below:

engaging the pipe element with the drive roller (box 148);

engaging the grooving roller with the pipe element (box 149);

forming the groove by rotating the pipe element about the longitudinal axis while forcing the grooving roller a discrete distance into the pipe element so as to displace material of the pipe element for a revolution of the pipe element (box 150);

measuring a circumference of the groove while rotating the pipe element (box 152);

determining a diameter of said groove using said circumference of said groove (box 154);

comparing the diameter of the groove with a tolerance range for the diameter of the groove (box 156); and until the groove diameter is within the tolerance range:

repeating said forming, determining and comparing steps (box 158).

It may be further advantageous to vary the size of the discrete distance over which the grooving roller moves, for example by decreasing the discrete distance for each the revolution as the diameter approaches the tolerance range. This may permit more precision in groove formation and decrease the time needed to form a groove.

Figure 13:
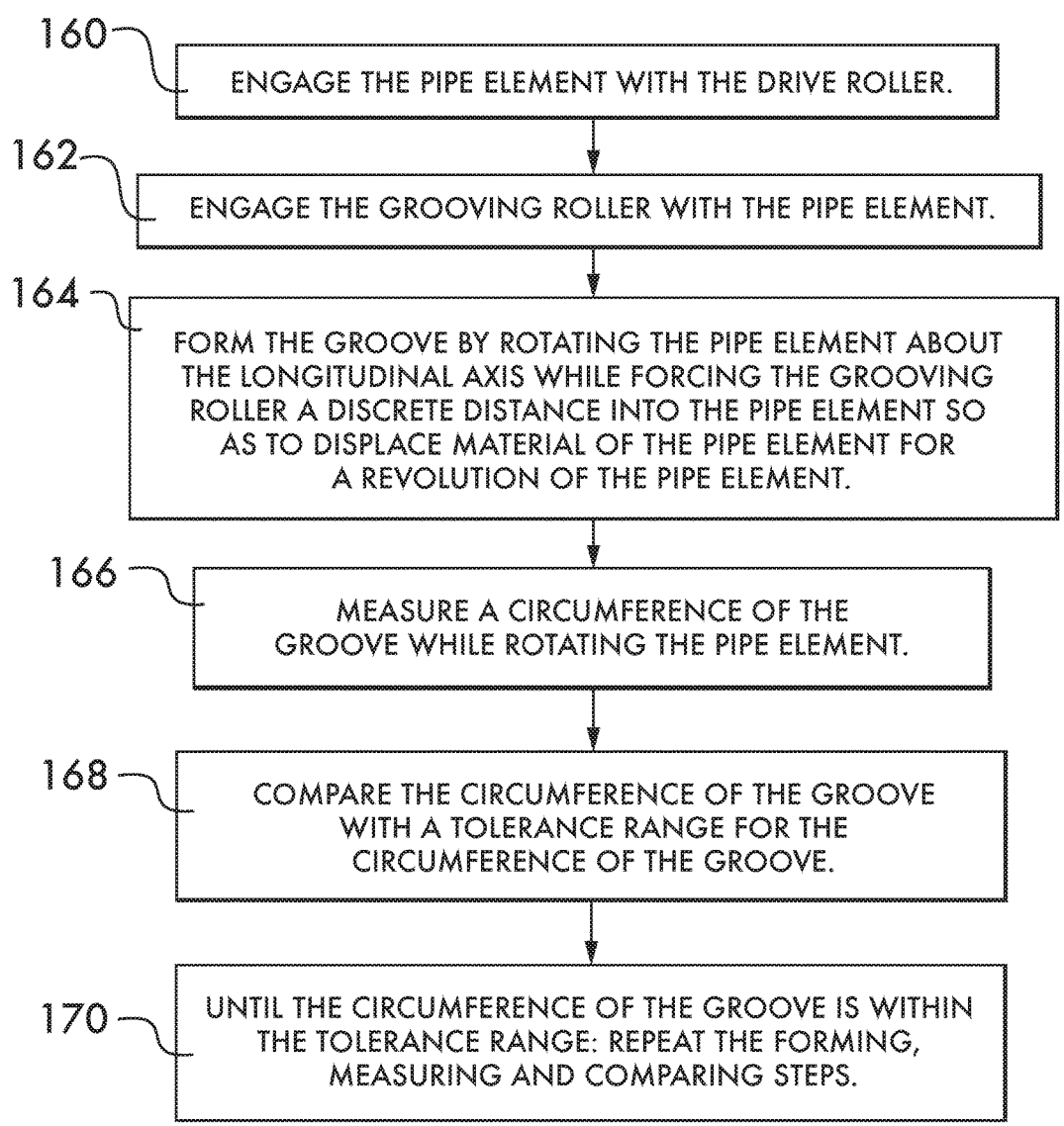

The example method described in FIG. 13 also uses discrete increments of the distance traveled by the grooving roller, but bases control of the grooving roller on measurements of the circumference of the groove, as described below:

engaging the pipe element with the drive roller (box 160);

engaging the grooving roller with the pipe element (box 162);

forming the groove by rotating the pipe element about the longitudinal axis while forcing the grooving roller a discrete distance into the pipe element so as to displace material of the pipe element for a revolution of the pipe element (box 164);

measuring a circumference of the groove while rotating the pipe element (box 166);

comparing the circumference of the groove with a tolerance range for the circumference of the groove (box 168); and until the circumference of the groove is within the tolerance range:

repeating said forming, measuring and comparing steps (box 170).

Again, it may be further advantageous to vary the size of the discrete distance over which the grooving roller moves, for example by decreasing the discrete distance for each the revolution as the diameter approaches the tolerance range. This may permit more precision in groove formation and decrease the time needed to form a groove.

In the example method shown in FIG. 14, the predictor-corrector aspects are combined with the discrete step-wise motion of the grooving roller as described below:

engaging the pipe element with the drive roller (box 172);

engaging the grooving roller with the pipe element (box 174);

forming the groove by rotating the pipe element about the longitudinal axis while forcing the grooving roller a discrete distance into the pipe element so as to displace material of the pipe element for a revolution of the pipe element (box 176);

calculating a number of revolutions of the pipe element needed to form a groove of a desired diameter using the discrete distance per revolution of the groove (box 178);

counting the number of revolutions of the pipe element (box 180); and stopping forcing the grooving roller into the pipe element the discrete distance upon reaching the number of revolutions needed to form the groove of the desired diameter (box 182).

Figure 14:
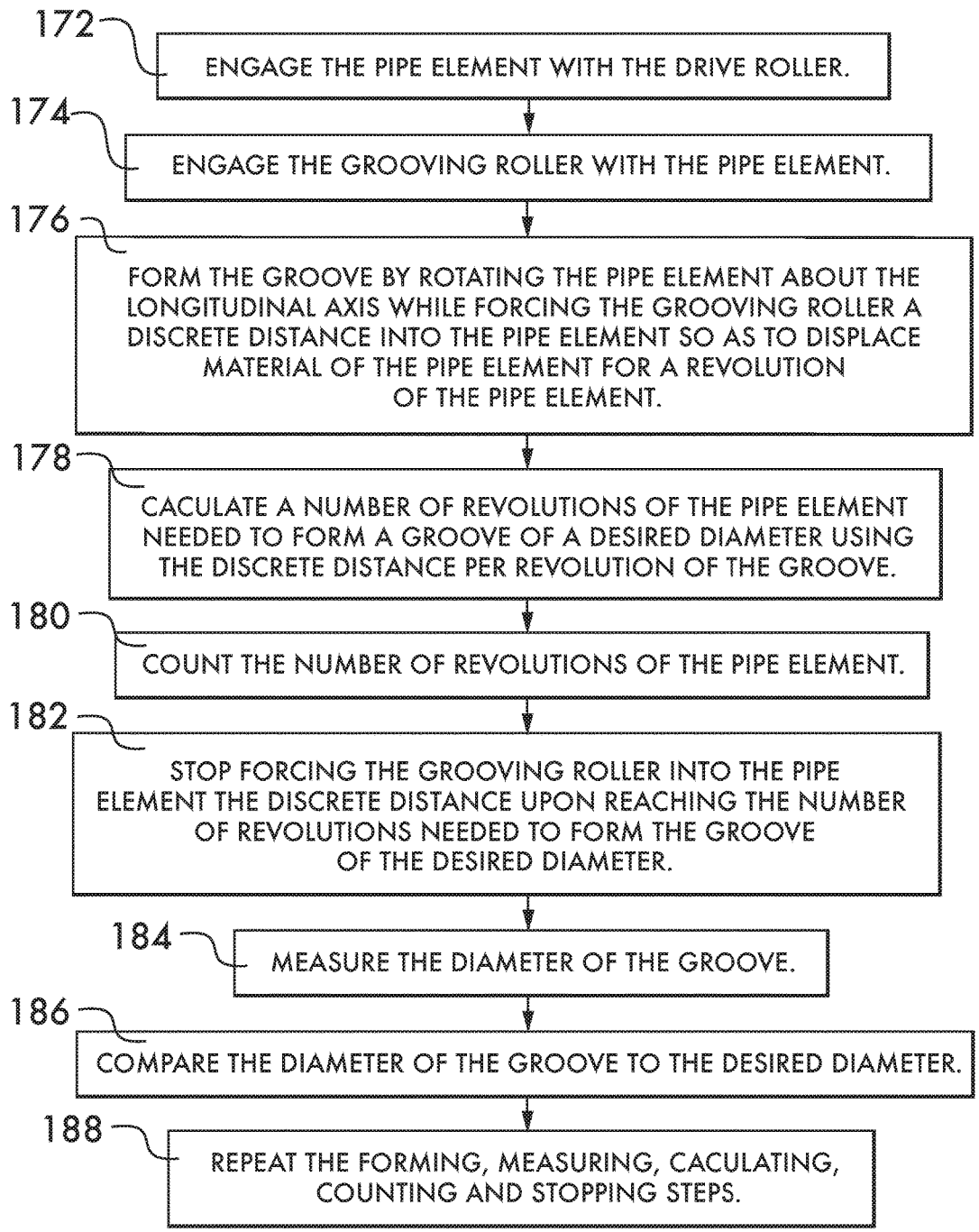

Again, it may be advantageous to add the following steps to the method shown in FIG. 14:

measuring the diameter of the groove (box 184);

comparing the diameter of the groove to the desired diameter (box 186);

repeating the forming, measuring, calculating, counting and stopping steps (box 188).

Figure 15:
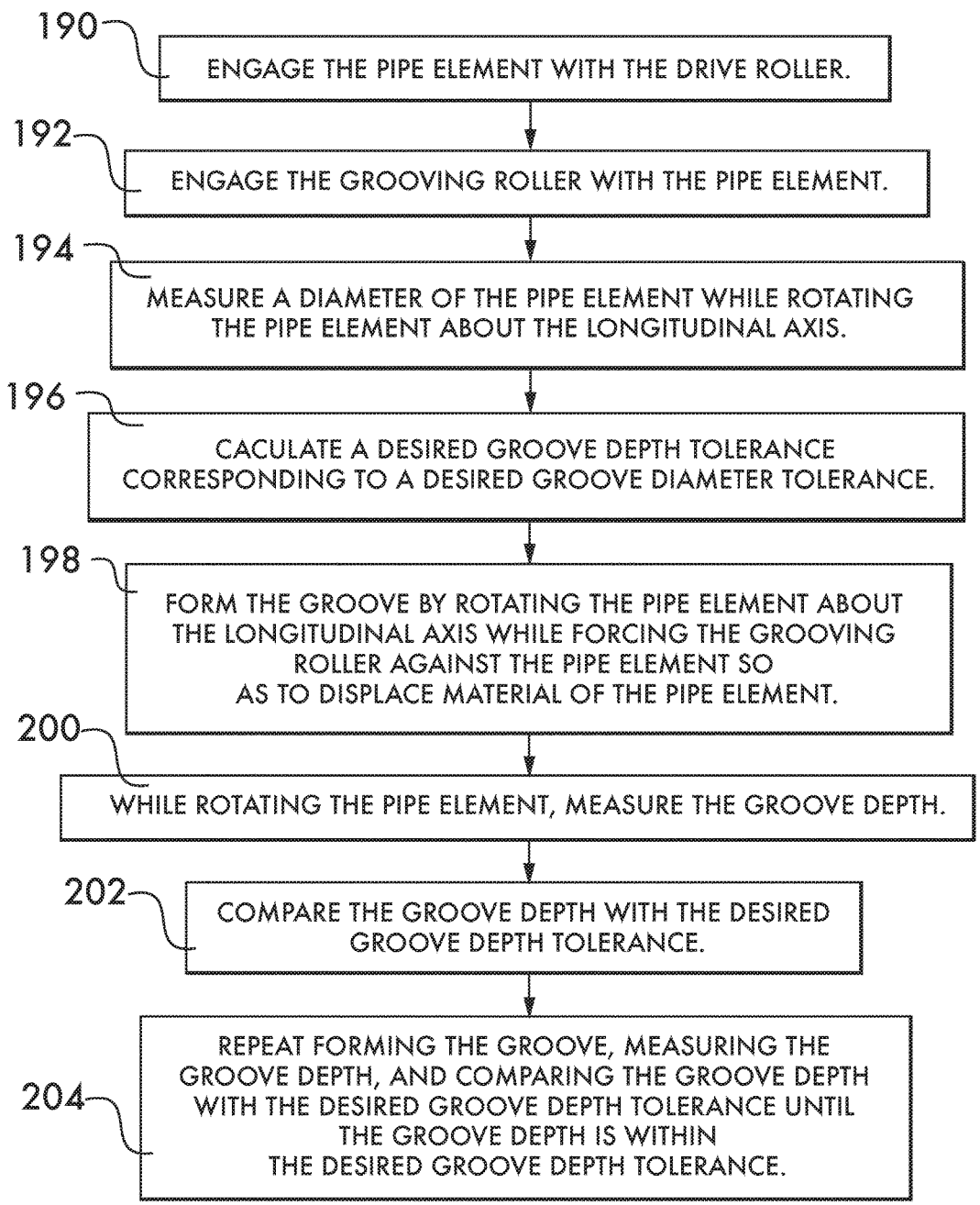

In the example method embodiment of FIG. 15, the groove depth 92 (see also FIG. 8) is used to control the motion of the grooving roller as described below:

engaging the pipe element with the drive roller (box 190);

engaging the grooving roller with the pipe element (box 192);

measuring a diameter of the pipe element while rotating the pipe element about the longitudinal axis (box 194);

calculating a desired groove depth tolerance corresponding to a desired groove diameter tolerance (box 196);

forming the groove by rotating the pipe element about the longitudinal axis while forcing the grooving roller against the pipe element so as to displace material of the pipe element (box 198);

while rotating the pipe element, measuring the groove depth (box 200);

comparing the groove depth with the desired groove depth tolerance (box 202); and repeating forming the groove, measuring the groove depth, and comparing the groove depth with the desired groove depth tolerance until the groove depth is within the desired groove depth tolerance (box 204).

Figure 16:
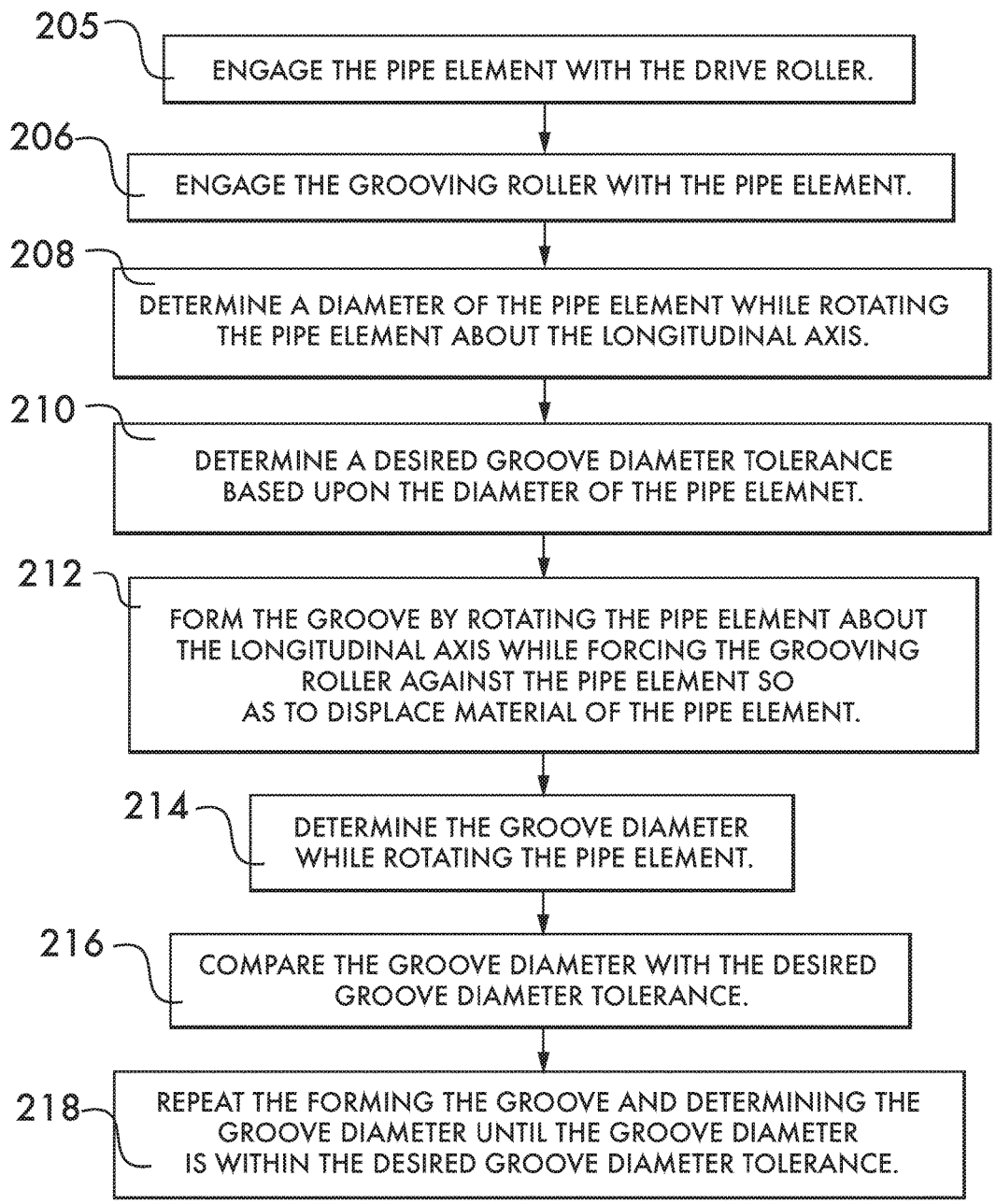

FIG. 16 shows an example method where the groove diameter is used to control the motion of the grooving roller, as described below:

engaging the pipe element with the drive roller (box 205);
engaging the grooving roller with the pipe element (box 206);
determining a diameter of the pipe element while rotating the pipe element about the longitudinal axis (box 208);
determining a desired groove diameter tolerance based upon the diameter of the pipe element (box 210);
forming the groove by rotating the pipe element about the longitudinal axis while forcing the grooving roller against the pipe element so as to displace material of the pipe element (box 212);
determining the groove diameter while rotating the pipe element (box 214);
comparing the groove diameter with the desire groove diameter tolerance (box 216);
repeating the forming the groove and determining the groove diameter until the groove diameter is within the desired groove diameter tolerance (box 218).

FIG. 17 illustrates an example method wherein the groove circumference is used to control the motion of the grooving roller, as described below:

engaging the pipe element with the drive roller (box 220);
engaging the grooving roller with the pipe element (box 224);
measuring a circumference of the pipe element while rotating the pipe element about the longitudinal axis (box 226);
determining a desired groove circumference tolerance based upon the diameter of the pipe element (box 228);
forming the groove by rotating the pipe element about the longitudinal axis while forcing the grooving roller against the pipe element so as to displace material of the pipe element (box 230);
measuring the groove circumference while rotating the pipe element (box 232);
comparing the groove circumference with the desired groove circumference tolerance (box 234);
repeating the forming the groove, the measuring the groove circumference, and the comparing the groove circumference steps until the groove circumference is within the desired groove circumference tolerance (box 236).

The methods and apparatus disclosed herein provide increased efficiency in the formation of grooved pipe elements which reduce the probability of human error as well as the frequency of mal-formed grooves.

What is claimed is:

1. A method of forming a circumferential groove in a pipe element having a longitudinal axis and using a machine comprising a control system, a drive roller and a grooving roller, said method comprising:

engaging said pipe element with said drive roller;
engaging said grooving roller with said pipe element;
measuring a diameter of said pipe element while rotating said pipe element about said longitudinal axis using said control system;
calculating a desired groove depth tolerance corresponding to a desired groove diameter tolerance using said control system;
forming said groove by rotating said pipe element about said longitudinal axis while forcing said grooving roller against said pipe element so as to displace material of said pipe element;
while rotating said pipe element, measuring said groove depth using said control system;
comparing said groove depth with said desired groove depth tolerance using said control system; and
repeating forming said groove, measuring said groove depth, and comparing said groove depth with said desired groove depth tolerance until said groove depth is within said desired groove depth tolerance.

2. The method according to claim 1, wherein measuring said diameter of said pipe element comprises:

rotating said pipe element while said pipe element is engaged with said grooving roller, said grooving roller having a known diameter and rotating in response to the pipe element;
determining a number of revolutions of said grooving roller, including fractions thereof, for each revolution of said pipe element; and
calculating said diameter of said pipe element, wherein said number of revolutions of said grooving roller, including said fractions thereof, per revolution of said pipe element being proportional to said diameter of said pipe element.

3. The method according to claim 2, wherein determining said number of revolutions of said grooving roller, including said fractions thereof, comprises counting said number of revolutions of said grooving roller, including said fractions thereof, for at least one said revolution of said pipe element.

4. The method according to claim 3, further comprising determining said at least one revolution of said pipe element by sensing a feature on said pipe element a first and a second time while rotating said pipe element.

5. The method according to claim 3, further comprising determining said at least one revolution of said pipe element by:

marking an outer surface of said pipe element with a light reflecting surface that contrasts with said outer surface of said pipe element;
shining a light onto said outer surface of said pipe element;
sensing a first and a second reflection of said light from said light reflecting surface while rotating said pipe element.

6. The method according to claim 3, further comprising determining at least one revolution of said pipe element by:

positioning a magnet on a surface of said pipe element;
sensing a first and a second magnetic field while rotating said pipe element.

7. The method according to claim 1, wherein said engaging said grooving roller with said pipe element comprises pinching said pipe element between said grooving roller and said drive roller with sufficient force to hold said pipe element therebetween.

8. The method according to claim 1, further comprising engaging an inner surface of said pipe element with said drive roller and engaging an outer surface of said pipe element with said grooving roller.

9. The method according to claim 1, further comprising selecting a rotational speed for rotating said pipe element based upon at least one characteristic of said pipe element.

10. The method according to claim 9, wherein said at least one characteristic of said pipe element is selected from the group consisting of a diameter, a wall thickness, a material of said pipe element and combinations thereof.

11. The method according to claim 1, further comprising selecting a force for forcing said grooving roller against said pipe element based upon at least one characteristic of said pipe element.

12. The method according to claim 11, wherein said at least one characteristic of said pipe element is selected from the group consisting of a diameter, a wall thickness, a material of said pipe element and combinations thereof.

13. The method according to claim 1, further comprising selecting a feed rate of said grooving roller for forming said groove in said pipe element based upon at least one characteristic of said pipe element.

14. The method according to claim 13, wherein said at least one characteristic of said pipe element is selected from the group consisting of a diameter, a wall thickness, a material of said pipe element and combinations thereof.

15. The method according to claim 1, wherein measuring said groove depth while rotating said pipe element comprises:
- projecting a fan-shaped beam of light onto said pipe element;
- sensing a reflection of said fan-shaped beam of light;
- using triangulation methods to calculate said groove depth.

* * * * *